United States Patent
Yoo et al.

(10) Patent No.: US 10,498,593 B2
(45) Date of Patent: Dec. 3, 2019

(54) CELL-SPECIFIC REFERENCE SIGNAL (CRS) AND CONTROL CHANNEL CONFIGURATION IN WIRELESS COMMUNICATIONS

(71) Applicant: QUALCOMM Incorporated, San Diego, CA (US)

(72) Inventors: Taesang Yoo, Riverside, CA (US); Xiaoxia Zhang, San Diego, CA (US); Tao Luo, San Diego, CA (US); Jing Sun, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 15/458,004

(22) Filed: Mar. 13, 2017

(65) Prior Publication Data

US 2018/0069750 A1    Mar. 8, 2018

Related U.S. Application Data

(60) Provisional application No. 62/384,689, filed on Sep. 7, 2016.

(51) Int. Cl.
*H04L 12/24*    (2006.01)
*H04W 72/08*    (2009.01)
(Continued)

(52) U.S. Cl.
CPC ............ *H04L 41/08* (2013.01); *H04L 5/0048* (2013.01); *H04W 72/042* (2013.01);
(Continued)

(58) Field of Classification Search
None
See application file for complete search history.

(56) References Cited

U.S. PATENT DOCUMENTS 10,250,420 B2 *   4/2019   Nory ................... H04L 27/2601
2006/0280113 A1 *   12/2006   Huo ...................... H04L 5/0048
                                                                       370/208
(Continued)

FOREIGN PATENT DOCUMENTS

WO    WO-2015014407 A1    2/2015

OTHER PUBLICATIONS

Huawei, "Views on TTI Length," 3GPP TSG RAN WG1 Meeting #84bis, R1-162108, Susan, Korea, Apr. 11-15, 2016, 5 pgs., XP051079955, 3rd Generation Partnership Project.
(Continued)

*Primary Examiner* — Faruk Hamza
*Assistant Examiner* — Cassandra L Decker
(74) *Attorney, Agent, or Firm* — Holland & Hart LLP

(57) ABSTRACT

Efficient cell-specific reference signal (CRS) and control channel configurations may be established dynamically based on channel conditions for one or more user equipment (UE) that may be served by a transmission. A base station may configure a CRS for a transmission time interval (TTI) based at least in part on a channel quality of one or more UEs that are to receive transmissions during the TTI. A number of downlink symbols at the beginning of the TTI may be used for CRS transmissions, and UEs with better channel quality may receive CRS transmissions and other control information in a first symbol, while UEs with a poorer channel quality may receive higher power CRS transmissions in the first symbol and the other control information is transmitted in a subsequent symbol.

29 Claims, 20 Drawing Sheets

(51) Int. Cl.
*H04W 72/04* (2009.01)
*H04L 5/00* (2006.01)
*H04W 88/02* (2009.01)
*H04W 52/02* (2009.01)

(52) U.S. Cl.
CPC ... *H04W 72/0446* (2013.01); *H04W 72/0473* (2013.01); *H04W 72/085* (2013.01); *H04W 88/02* (2013.01)

(56) References Cited

U.S. PATENT DOCUMENTS

| | | | | |
|---|---|---|---|---|
| 2011/0199986 | A1* | 8/2011 | Fong | H04L 5/0035 370/329 |
| 2011/0319025 | A1* | 12/2011 | Siomina | H04B 7/024 455/63.1 |
| 2012/0155561 | A1* | 6/2012 | Seo | H04B 7/15542 375/260 |
| 2012/0176982 | A1* | 7/2012 | Zirwas | H04B 7/024 370/329 |
| 2012/0243500 | A1* | 9/2012 | Chandrasekhar | H04W 72/02 370/330 |
| 2013/0003604 | A1* | 1/2013 | Blankenship | H04L 5/0023 370/255 |
| 2013/0114496 | A1* | 5/2013 | Mazzarese | H04L 5/0023 370/312 |
| 2013/0225189 | A1 | 8/2013 | Moon et al. | |
| 2014/0241293 | A1* | 8/2014 | Luo | H04L 5/0053 370/329 |
| 2014/0269368 | A1* | 9/2014 | Xu | H04W 24/00 370/252 |
| 2014/0355470 | A1* | 12/2014 | Nagata | H04W 72/042 370/252 |
| 2015/0333880 | A1* | 11/2015 | Yi | H04L 5/001 370/329 |
| 2015/0359004 | A1* | 12/2015 | Xu | H04W 74/0833 370/329 |
| 2016/0183112 | A1* | 6/2016 | Yang | H04B 17/00 370/252 |

OTHER PUBLICATIONS

ISA/EP, International Search Report and Written Opinion of the International Searching Authority, Int'l Application No. PCT/US2017/048538, dated Nov. 10, 2017, European Patent Office, Rijswijk, NL, 16 pgs.

Qualcomm Incorporated, "Self-Contained Subframe Timeline Analysis," SGPT TSG-RAN WG1 Meeting #86, R1-166362, Gothenburg, Sweden, Aug. 22-26, 2016, 7 pgs., XP051140182, 3rd Generation Partnership Project.

* cited by examiner

US 10,498,593 B2

CELL-SPECIFIC REFERENCE SIGNAL (CRS) AND CONTROL CHANNEL CONFIGURATION IN WIRELESS COMMUNICATIONS

CROSS REFERENCES

The present Application for Patent claims priority to U.S. Provisional Patent Application No. 62/384,689 by Yoo, et al., entitled "Cell-Specification Reference Signal (CRS) And Control Channel Configuration In Wireless Communications," filed Sep. 7, 2016, assigned to the assignee hereof.

INTRODUCTION

The following relates generally to wireless communication, and more specifically to cell-specific reference signal (CRS) and control channel configuration in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of next generation NodeBs (gNBs) which in some cases may include smart radio heads (radio heads (RHs)) in communication with a number of access node controllers (ANCs). A base station may communicate with a set of UEs on downlink (DL) channels (e.g., for transmissions from a base station to a UE) and uplink (UL) channels (e.g., for transmissions from a UE to a base station).

Subframes of communication between a network access device (e.g., a gNB, an eNB, an ANC, a RH, or a base station) and a plurality of UEs may include different regions or channels that are assembled in accordance with a time division duplex (TDD) and/or frequency division duplex (FDD) subframe structure. Subframes may also include arrangements of UL channels and/or DL channels. Subframes may also include one or more reference signals that may be used for control channel demodulation. In cases where wireless transmissions may use shared radio frequency spectrum, reference signals may also be used to detect whether a transmitter is transmitting, and/or one or more channels used for a transmission. Providing such reference signals that can provide reliable and efficient use of system resources may enhance the operation of a wireless multiple-access communication system.

SUMMARY

A method of wireless communication is described. The method may include identifying at least a first UE that is to receive a downlink transmission during a first transmission time interval (TTI), identifying a channel quality of the first UE, configuring a cell-specific reference signal (CRS) based at least in part on the channel quality of the first UE, and transmitting the CRS to the first UE during the first TTI.

An apparatus for wireless communication is described. The apparatus may include means for identifying at least a first UE that is to receive a downlink transmission during a first TTI, means for identifying a channel quality of the first UE, means for configuring a CRS based at least in part on the channel quality of the first UE, and means for transmitting the CRS to the first UE during the first TTI.

Another apparatus for wireless communication is described. The apparatus may include a processor, memory in electronic communication with the processor, and instructions stored in the memory. The instructions may be operable to cause the processor to identify at least a first UE that is to receive a downlink transmission during a first TTI, identify a channel quality of the first UE, configure a CRS based at least in part on the channel quality of the first UE, and transmit the CRS to the first UE during the first TTI.

A non-transitory computer readable medium for wireless communication is described. The non-transitory computer-readable medium may include instructions operable to cause a processor to identify at least a first UE that is to receive a downlink transmission during a first TTI, identify a channel quality of the first UE, configure a CRS based at least in part on the channel quality of the first UE, and transmit the CRS to the first UE during the first TTI.

Some examples of the method, apparatus, and non-transitory computer-readable medium described above may further include processes, features, means, or instructions for configuring a starting point for a downlink control channel transmission to the first UE within the TTI based at least in part on the CRS. Some examples of the method, apparatus, and non-transitory computer-readable medium described above may configure a CRS transmission power based at least in part on the channel quality of the first UE, and may configure a concurrent downlink control channel transmission power based at least in part on the CRS transmission power.

Some examples of the method, apparatus, and non-transitory computer-readable medium described above may further include processes, features, means, or instructions for dynamically configuring the CRS for each TTI of a plurality of TTIs based at least in part on the channel quality of one or more UEs to receive the downlink transmission during the TTI.

Some examples of the method, apparatus, and non-transitory computer-readable medium described above may further include processes, features, means, or instructions for identifying a second set of UEs that are to receive a second downlink transmission during a second TTI, identifying a second UE of the second set of UEs having a poorer channel quality than other UEs of the second set of UEs; configuring a second CRS based at least in part on the channel quality of the second UE; and transmitting the second CRS to the second set of UEs during the second TTI.

In some examples of the method, apparatus, and non-transitory computer-readable medium described above, a first symbol of the TTI comprises a set of resource elements (REs), and wherein the configuring the CRS comprises: configuring a first subset of the REs for transmission of the CRS, configuring a second subset of the REs for a downlink control channel transmission, configuring a first power for the first subset of REs based at least in part on the channel quality of the first UE, and configuring a second power for the second subset of REs based at least in part on the first power.

In some examples of the method, apparatus, and non-transitory computer-readable medium described above, a second symbol of the TTI comprises a physical downlink control channel (PDCCH) transmission. Some examples of the method, apparatus, and non-transitory computer-readable medium described above may further include processes, features, means, or instructions for transmitting signaling to the first UE that indicates whether the PDCCH transmission starts in the first symbol or in the second symbol. Signaling may include, in some examples, layer-one (L1) signaling transmitted in the first symbol or a search space restriction for the first UE.

In some examples of the method, apparatus, and non-transitory computer-readable medium described above, the first power for the first subset of REs may be configured with a higher power than the second power for the second subset of REs when the channel quality of the first UE is below a threshold value. In some examples of the method, apparatus, and non-transitory computer-readable medium described above, the downlink control channel transmission may be deferred to a second symbol of the TTI after the first symbol when the second power for the second subset of REs is below the power threshold value. In some examples, the first power for the first subset of REs may be configured with equivalent power as the second power for the second subset of REs when the channel quality of the first UE is above a threshold value.

In some examples of the method, apparatus, and non-transitory computer-readable medium described above, each of a first symbol of the TTI and a second symbol of the TTI comprise a set of REs, and wherein the configuring the CRS comprises: configuring a first subset of the REs across the first symbol and second symbol for transmission of the CRS, and configuring a second subset of the REs in each of the first symbol and second symbol for transmission of a downlink control channel transmission. Some examples of the method, apparatus, and non-transitory computer-readable medium described above may further include processes, features, means, or instructions for transmitting signaling to the first UE that the first UE is to receive the CRS transmitted in the first symbol or that the first UE is to combine the CRS transmissions from the first symbol and the second symbol, based at least in part on the channel quality of the UE. In some examples, the signaling to the first UE may indicate whether only a first symbol of the TTI or both the first symbol and a second symbol of the TTI include CRS and downlink control information, and, when both the first symbol and the second symbol include CRS and downlink control information, whether the second symbol includes CRS transmissions. In some examples, the signaling may be L1 signaling transmitted in the first symbol of the TTI.

In some examples of the method, apparatus, and non-transitory computer-readable medium described above, the configuring the CRS further comprises determining whether the channel quality of the first UE exceeds a threshold value, configuring a concurrent downlink control channel transmission in a second subset of resources of the first symbol when the channel quality of the first UE exceeds the threshold value, and configuring a second CRS for transmission in the second subset of resources of the first symbol when the channel quality of the first UE does not exceed the threshold value.

A method of wireless communication is described. The method may include receiving, at a UE, a downlink transmission from a base station during a first TTI, determining a CRS configuration of the downlink transmission, and receiving the CRS based at least in part on the CRS configuration.

An apparatus for wireless communication is described. The apparatus may include means for receiving, at a UE, a downlink transmission from a base station during a first TTI, means for determining a CRS configuration of the downlink transmission, and means for receiving the CRS based at least in part on the CRS configuration.

Another apparatus for wireless communication is described. The apparatus may include a processor, memory in electronic communication with the processor, and instructions stored in the memory. The instructions may be operable to cause the processor to receive, at a UE, a downlink transmission from a base station during a first TTI, determine a CRS configuration of the downlink transmission, and receive the CRS based at least in part on the CRS configuration.

A non-transitory computer readable medium for wireless communication is described. The non-transitory computer-readable medium may include instructions operable to cause a processor to receive, at a UE, a downlink transmission from a base station during a first TTI, determine a CRS configuration of the downlink transmission, and receive the CRS based at least in part on the CRS configuration.

Some examples of the method, apparatus, and non-transitory computer-readable medium described above may further include processes, features, means, or instructions for determining a starting point for a downlink control channel transmission within the TTI based at least in part on the CRS configuration. Some examples of the method, apparatus, and non-transitory computer-readable medium described above may further include processes, features, means, or instructions for receiving signaling that indicates a starting point for a PDCCH based at least in part on the CRS configuration. In some examples, the signaling comprises L1 signaling transmitted in a first symbol of the TTI or a search space restriction for the first UE.

In some examples of the method, apparatus, and non-transitory computer-readable medium described above, each of a first symbol of the TTI and a second symbol of the TTI comprise a portion of the CRS transmission, and wherein the receiving the CRS comprises: combining CRS transmissions received in the first symbol and second symbol. Some examples of the method, apparatus, and non-transitory computer-readable medium described above may further include processes, features, means, or instructions for receiving signaling that the CRS transmissions from the first symbol and the second symbol are to be combined.

Some examples of the method, apparatus, and non-transitory computer-readable medium described above may further include processes, features, means, or instructions for receiving signaling from the base station that indicates whether only a first symbol of the TTI or both the first symbol and a second symbol of the TTI include CRS and downlink control information, and, when both the first symbol and the second symbol include CRS and downlink control information, whether the second symbol includes CRS transmissions. In some examples, the signaling may be layer-one (L1) signaling transmitted in the first symbol of the TTI.

In some examples of the method, apparatus, and non-transitory computer-readable medium described above, the determining the CRS configuration comprises determining that a first CRS is configured for transmission in a first subset of resources of a first symbol of the TTI. Some examples of the method, apparatus, and non-transitory computer-readable medium described above may further include processes, features, means, or instructions for determining whether a concurrent downlink control channel transmission is configured in a second subset of resources of the first symbol, or a second CRS is configured for transmission in the second subset of resources of the first symbol. Some examples of the method, apparatus, and non-transitory computer-readable medium described above may further include processes, features, means, or instructions for blindly detecting the presence of the second CRS.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
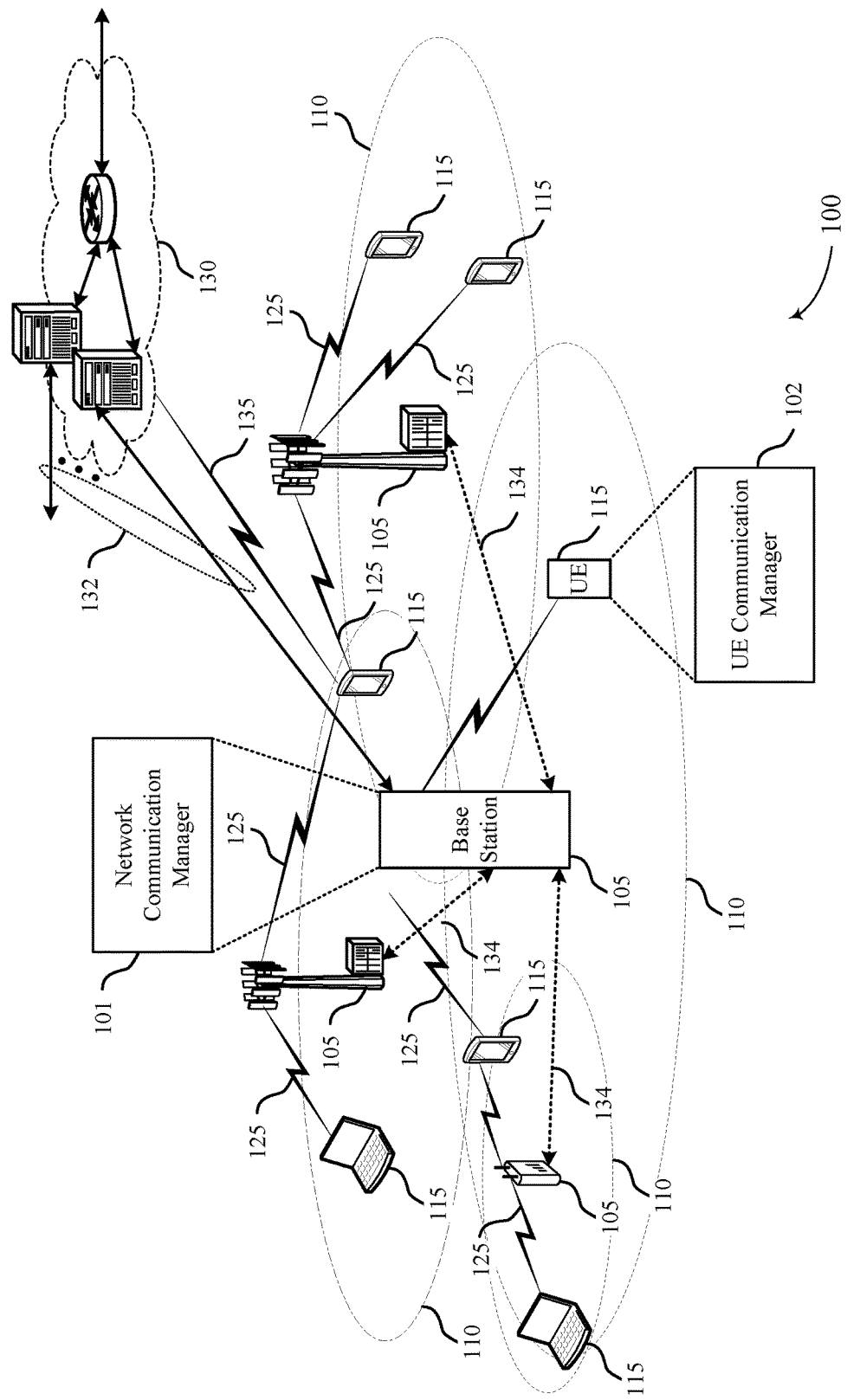
FIG. 1 illustrates an example of a system for wireless communication that supports cell-specific reference signal (CRS) and control channel configuration in wireless communications in accordance with aspects of the present disclosure.

Techniques are described that provide efficient CRS and control channel configurations that may be established dynamically based on channel conditions for one or more user equipment (UE) that may be served by a transmission. Next generation networks (e.g., 5G or new radio (NR) networks) are being designed to support features such as high bandwidth operations, more dynamic subframe types, and self-contained subframe types (in which hybrid automatic repeat request (HARD) feedback for a subframe may be transmitted before the end of the subframe). Further, some networks may utilize radio frequency spectrum in which particular CRS and control channel configurations may help to provide efficient signaling to one or more UEs. For example, some networks may use shared radio frequency spectrum in which CRS transmissions may be used to help detect transmissions, or beamforming of CRS transmissions may be used in millimeter wave deployments or deployments that use coordinated multi-point (CoMP) transmissions.

According to various aspects of the disclosure, a base station may configure a CRS for a transmission time interval (TTI) based at least in part on a channel quality of one or more UEs that are to receive transmissions during the TTI. In some cases, a number of downlink symbols at the beginning of the TTI may be used for CRS transmissions, and UEs with better channel quality (e.g., UEs near a center of a coverage area of a base station) may receive CRS transmissions and other control information in a first symbol, while UEs with a poorer channel quality (e.g., UEs near an edge of a coverage area of a base station) may receive higher power CRS transmissions in the first symbol and the other control information in a subsequent symbol. In some examples, the configuration of the CRS and control information within one or more symbols may be dynamically configured based on the conditions of UEs that are to receive the transmission. In some examples, a base station may frequency division multiplex (FDM) CRS and control information in a first symbol of a TTI when the UE that is to receive the transmission has a relatively good channel quality. The base station, in some examples, may increase a transmission power for CRS tones and decrease transmission power for control tones based at least in part on a channel quality metric (e.g., CQI) of the receiving UE.

While various examples described herein refer to a base station identifying CRS and control channel configurations based on a single UE, it will be understood that CRS may be common to multiple UEs being served during a TTI by a base station, and a base station may serve a mix of UEs with both relatively good and relatively poor channel qualities in one TTI. In such a case, the base station may use the CRS and control channel configuration for UEs with relatively poor channel qualities to make sure that the CRS and control can reliably reach all the UEs. In such cases, the UEs with relatively good channel quality will see CRS and control channel configuration that are established for the UEs with relatively poor channel qualities. In cases where a base station is exclusively serving one or more UEs with relatively good channel quality in a TTI, each UE will see the CRS and control configuration that are established for the UEs with relatively good channel qualities. Thus, in examples that describe the determination of a CRS and control channel configuration for only a single UE, such a configuration may apply to one or more other UEs being served in the same TTI that have better channel qualities. It is to be noted, however, that in examples that utilize millimeter wave or CoMP transmission techniques, as will be discussed below, CRS and control channel configuration may be selected individually for each UE.

A UE operating in systems that provide CRS and control channel configuration according to various aspects of the disclosure may receive a downlink transmission from a base station, determine the CRS configuration of the downlink transmission, and receive the CRS based at least in part on the determined CRS configuration. In some cases, a UE may determine a CRS configuration based on signaling from the base station (e.g., layer-one (L1) signaling or a search space restriction provided to the UE) that indicates the CRS configuration.

Aspects of the disclosure are initially described in the context of a wireless communications system. Aspects of the disclosure are further illustrated by and described with reference to apparatus diagrams, system diagrams, and flowcharts that relate to CRS and control channel configuration in wireless communications.

FIG. 1 illustrates an example of a wireless communication system 100, in accordance with various aspects of the disclosure. The wireless communication system 100 may include base stations 105 (e.g., gNodeBs (gNBs), network access devices, access node controllers (ANCs) and/or radio heads (RHs)), UEs 115, and a core network 130. Wireless communication system 100 may support dynamic CRS and control channel configuration for transmissions in different TTIs, based on one or more conditions at a receiving UE.

The core network 130 may provide user authentication, access authorization, tracking, Internet Protocol (IP) connectivity, and other access, routing, or mobility functions. At least some of the base stations 105 (e.g., network access devices, gNBs, ANCs, RHs) may interface with the core network 130 through backhaul links 132 (e.g., S1, S2, etc.) with the core network 130 and may perform radio configuration and scheduling for communication with the UEs 115. In various examples, ANCs may communicate, either directly or indirectly (e.g., through core network 130), with each other over backhaul links 134 (e.g., X1, X2, etc.), which may be wired or wireless communication links. Each ANC may additionally or alternatively communicate with a number of UEs 115 through a number of smart radio heads. In an alternative configuration of the wireless communication system 100, the functionality of an ANC may be provided by a radio head or distributed across the radio heads of a gNB.

In some examples, the wireless communication system 100 may include a 5G network. In other examples, the wireless communication system 100 may include a LTE/LTE-A network. The wireless communication system 100 may in some cases be a heterogeneous network, in which different types of base stations 105 (e.g., gNBs, eNBs, ANCs, etc.) provide coverage for various geographical regions. The term "cell" is a 3GPP term that can be used to describe a base station, a radio head, a carrier or component carrier associated with a base station or a radio head, or a coverage area (e.g., sector, etc.) of a carrier or base station, depending on context.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. A UE 115 may communicate with the core network 130 through communication link 135. UEs 115 may be dispersed throughout the wireless communications system 100, and each UE 115 may be stationary or mobile.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may additionally or alternatively be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may additionally or alternatively be a cellular phone, a personal digital assistant (PDA), a wireless modem, a wireless communication device, a handheld device, a tablet computer, a laptop computer, a cordless phone, a wireless local loop (WLL) station, an Internet of things (IoT) device, an Internet of Everything (IoE) device, a machine type communication (MTC) device, an appliance, an automobile, or the like.

The communication links 125 shown in wireless communication system 100 may include uplink channels from a UE 115 to a base station 105, and/or downlink channels, from a base station 105 to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a TTI of a downlink channel may be distributed between different control regions in a cascaded manner (e.g., between a common control region and one or more UE-specific control regions).

One or more of base stations 105 may include a network communication manager 101, which may identify a UE 115 that is to receive a downlink transmission during a first TTI, identify a channel quality of the UE 115 (e.g., based on a channel quality indicator (CQI) provided by the UE 115, a sounding reference signal (SRS) received from the UE 115, a received signal reference power (RSRP) of the UE 115, a reference signal received quality (RSRQ) of the UE 115, or any combination thereof), and configure a CRS transmission based at least in part on the channel quality of the UE 115.

Control information may be configured to be transmitted concurrently with CRS within a same symbol in cases where the channel quality is relatively good, and may be configured to be transmitted after the CRS when channel quality is relatively poor, for example.

UEs 115 may include a UE communication manager 102, which may receive a downlink transmission from a base station 105 during a TTI, determine a CRS configuration of the downlink transmission, and receive the CRS based at least in part on the CRS configuration. In examples that use shared spectrum for transmissions, the CRS may be used to determine whether a base station 105 is transmitting in a TTI (e.g., whether the base station successfully completed a listen before talk (LBT) procedure), and/or a number of channels that may be used in a transmission (e.g., a number of 20 MHz channels of a 80 MHz system bandwidth that passed LBT).

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, and shorter transmission time interval (TTIs). In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable. A 5G new radio (NR) carrier may be considered an eCC.

Downlink control information may be transmitted from a base station 105 to a UE 115 using one or more physical downlink control channel (PDCCH) transmissions. In some examples, PDCCH transmissions may be transmitted concurrently with CRS transmissions, or may be transmitted following CRS transmissions within a TTI. The PDCCH may carry a message known as downlink control information (DCI), which includes transmission resource assignments and other control information for a UE 115 or group of UEs 115, such as downlink scheduling assignments, uplink resource grants, transmission scheme, uplink power control, hybrid automatic repeat request (HARD) information, MCS and other information, or any combinations thereof. To reduce power consumption and overhead at the UE 115, a limited set of transmission resources may be specified for DCI associated with a specific UE 115, which may be known as a search space. The search space can be partitioned into two regions: a search space and a UE-specific (dedicated) search space.

Wireless communication system 100 may operate in an ultra high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length, and systems that use this region may be referred to as millimeter wave (mmWave) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

Figure 2:
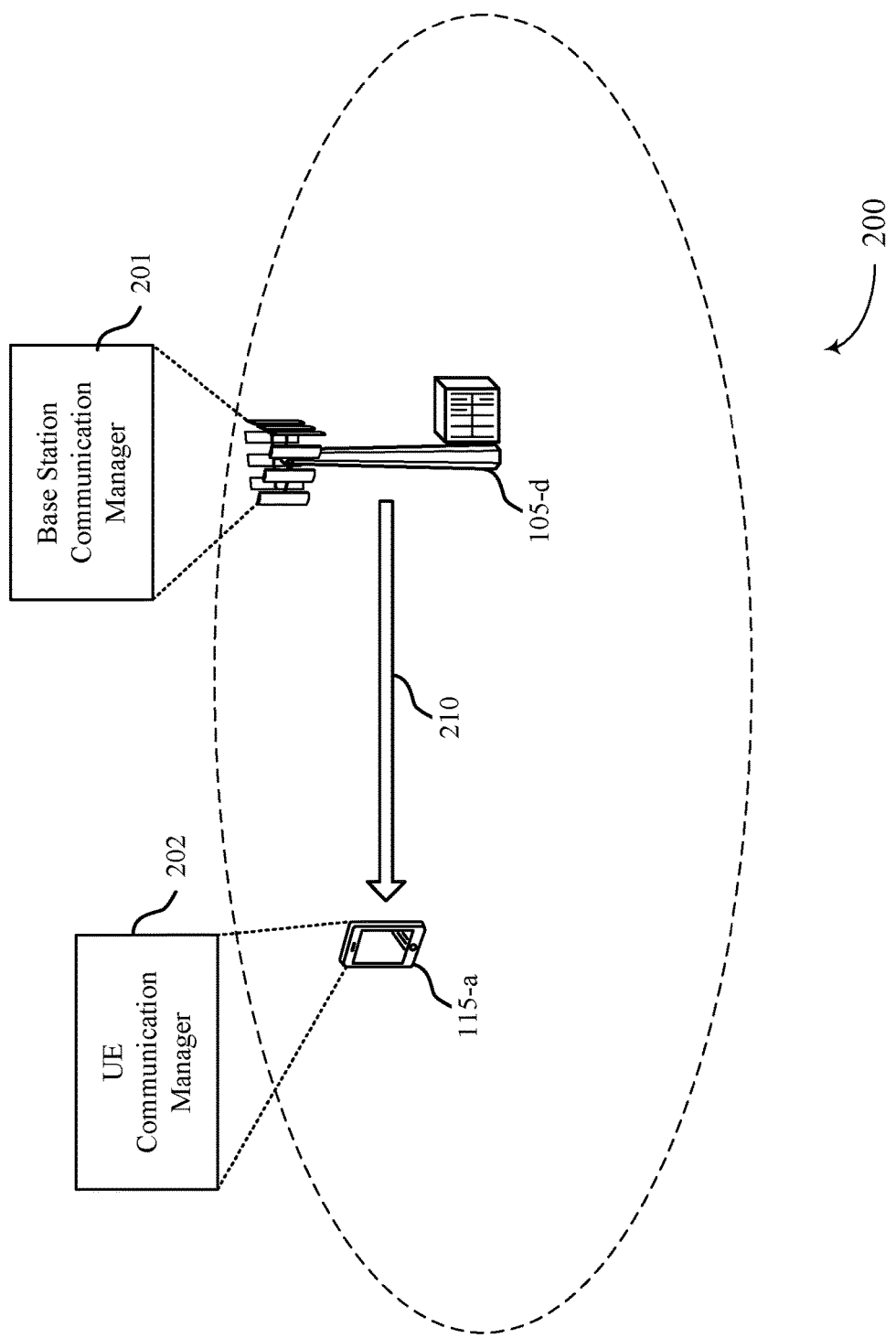
FIG. 2 illustrates an example of a wireless communications system that supports CRS and control channel configuration in wireless communications in accordance with aspects of the present disclosure.

FIG. 2 illustrates an example of a wireless communications system 200 that supports CRS and control channel configuration in wireless communications in accordance with aspects of the present disclosure. Wireless communications system 200 may include base station 105-d, and UE 115-a, which may be examples of the corresponding devices described with reference to FIG. 1. Wireless communications system 200 may use a communications configuration that includes uplink-centric subframes and downlink-centric subframes that may include CRS and control information in one or more initial symbols of a subframe transmitted in a downlink transmission 210.

CRS transmissions in downlink transmission 210 may be used, for example, to aid in control channel demodulation at the UE 115-a. In examples where the downlink transmission is made using shared spectrum, whether the downlink transmission 210 is transmitted at all depends upon the outcome of an LBT procedure. In such cases, the CRS may be used for burst detection to determine if the base station 105-d is transmitting at a given subframe on a given channel. Furthermore, CRS may be used for bandwidth detection. For example, certain deployments may use shared spectrum in which LBT procedures are performed individually for multiple channels of a total system bandwidth (e.g., LBT may be performed per 20 MHz channel of an 80 MHz system bandwidth). In such deployments, the UE 115-a may perform burst detection for each channel of the system bandwidth, in order to figure out the actual transmission bandwidth. In such shared spectrum deployments, reliable burst detection is important and may be an important factor in the overhead required for CRS.

CRS overhead may be selected to be large in order to provide reliable burst when the UE 115-a is located at a cell edge, or edge of a coverage area, of base station 105-d.

However, if the UE 115-*a* is located near the cell center, a CRS transmission may be relatively easily detected, and a large CRS overhead may be inefficient in such situations. Rather than used a fixed large CRS overhead, various aspects of this disclosure provide for dynamic CRS and control channel configurations depending on channel conditions of the UE 115-*a*. Thus, the CRS resources and control region of downlink transmission 210 can be made dynamic (e.g., a PDCCH starting point can be made dynamic).

In some examples, the base station 105-*d* may include a base station communication manager 201, which may be an example of network communication manager 101 of FIG. 1, and may be used to identify the UE 115-*a* that is to receive downlink transmission 210, identify a channel quality of the UE 115-*a* (e.g., based on a channel quality indicator (CQI) provided by the UE 115-*d*), and configure a CRS transmission based at least in part on the channel quality of the UE 115-*d*. Control information may be configured to be transmitted concurrently with CRS within a same symbol in cases where the channel quality is relatively good, and may be configured to be transmitted after the CRS when channel quality is relatively poor, for example. In some cases, the CRS may be dynamically configured for each TTI of a number of TTIs based at least in part on the channel quality of one or more UEs 115 to receive the downlink transmission during the TTI.

The UE 115-*a* may include a UE communication manager 202, which may be an example of UE communication manager 102 of FIG. 1, and may be used to receive downlink transmission 210 from the base station 105-*d*, determine a CRS configuration of the downlink transmission 210, and receive the CRS based at least in part on the CRS configuration. In examples that use shared spectrum for transmissions, the CRS may be used to determine whether the base station 105-*d* is transmitting in a TTI (e.g., whether the base station 105-*d* successfully completed a LBT procedure), and/or a number of channels that may be used in a transmission (e.g., a number of 20 MHz channels of a 80 MHz system bandwidth that passed LBT).

Figure 3:
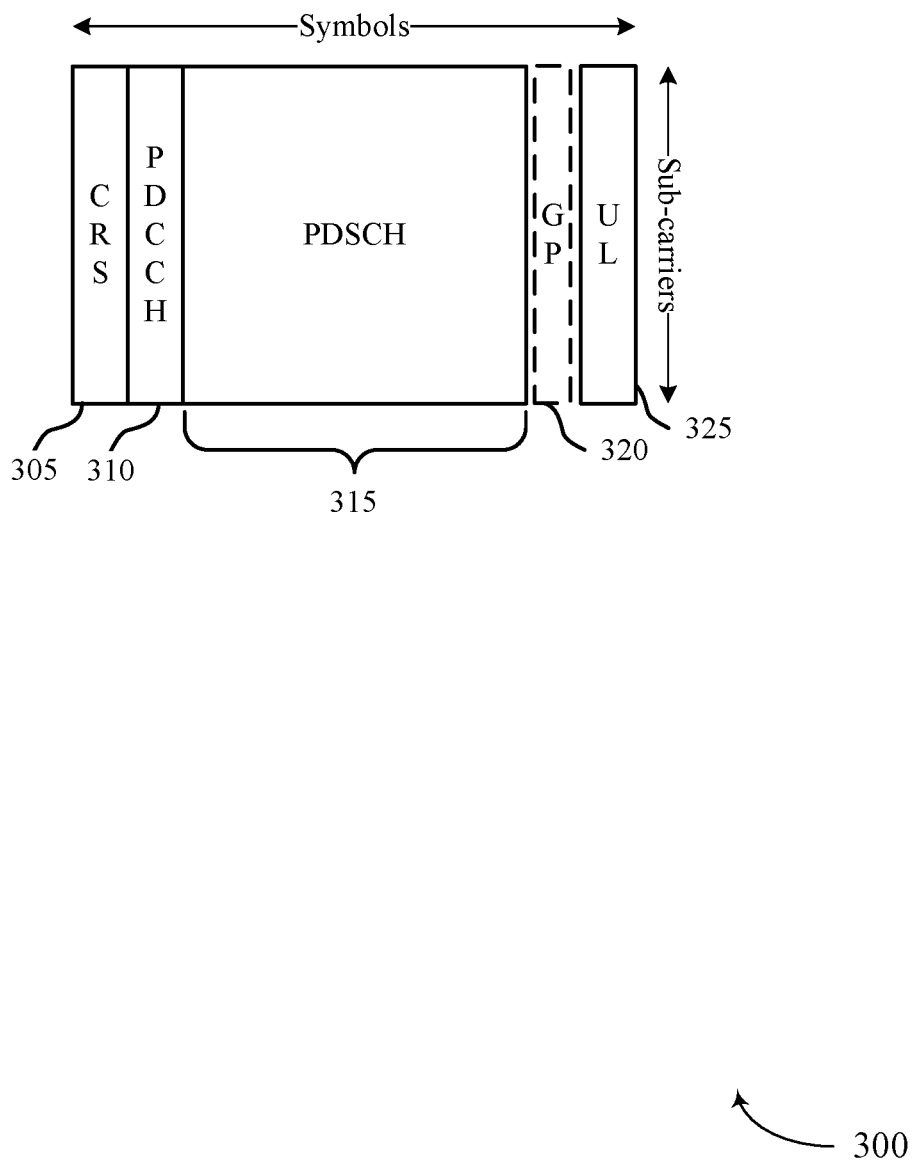
FIG. 3 illustrates an example of a CRS and control channel configuration in accordance with aspects of the present disclosure.

FIG. 3 illustrates an example of a subframe associated with a DL-centric dynamic subframe 300 in accordance with aspects of the present disclosure. In some examples, the DL-centric dynamic subframe type may be selected for the subframe 300, by a network access device such as a base station 105 of FIGS. 1-2, based at least in part on a UL/DL traffic ratio. For example, a base station may select a DL-centric dynamic subframe type for the subframe 300 when the UL/DL traffic ratio that indicates more traffic is queued by the base station for transmission to one or more UEs than is queued by the one or more UEs for transmission to the base station. In some examples, the base stations and UEs that communicate in the subframe 300 may be examples of aspects of the base stations 105 and UEs 115 described with reference to FIGS. 1-2. While various examples described herein use downlink-centric subframes, it will be understood that the techniques described are equally applicable to other types of subframes, such as pure downlink subframes, uplink-centric subframes that may include an initial downlink transmission followed by uplink transmissions, or other types of subframes or transmissions that may use downlink CRS information.

The subframe 300 may begin with a DL control region that may include CRS 305 and PDCCH 310 in an initial two symbols of the subframe 300. Following the PDCCH 310, the base station may schedule a data region 315, which may include physical downlink shared channel (PDSCH) transmissions. Following the data region 315, a guard period 320 may be provided to allow the UE to perform RF switching from downlink receptions to uplink transmissions. Following the guard period 320, an uplink common burst symbol 325 may be scheduled for transmission by the UE of information such as a sounding reference signal (SRS), scheduling request (SR), feedback (e.g., ACK/NACK information), or uplink data. Such an uplink common burst symbol 325 may allow for a self-contained subframe 300, in which feedback on successful reception of data in the data region 315 may be provided within the same subframe, which may provide for lower latency and enhanced data throughput relative to providing feedback information in some number of subframes after the data region 315.

Figure 4:
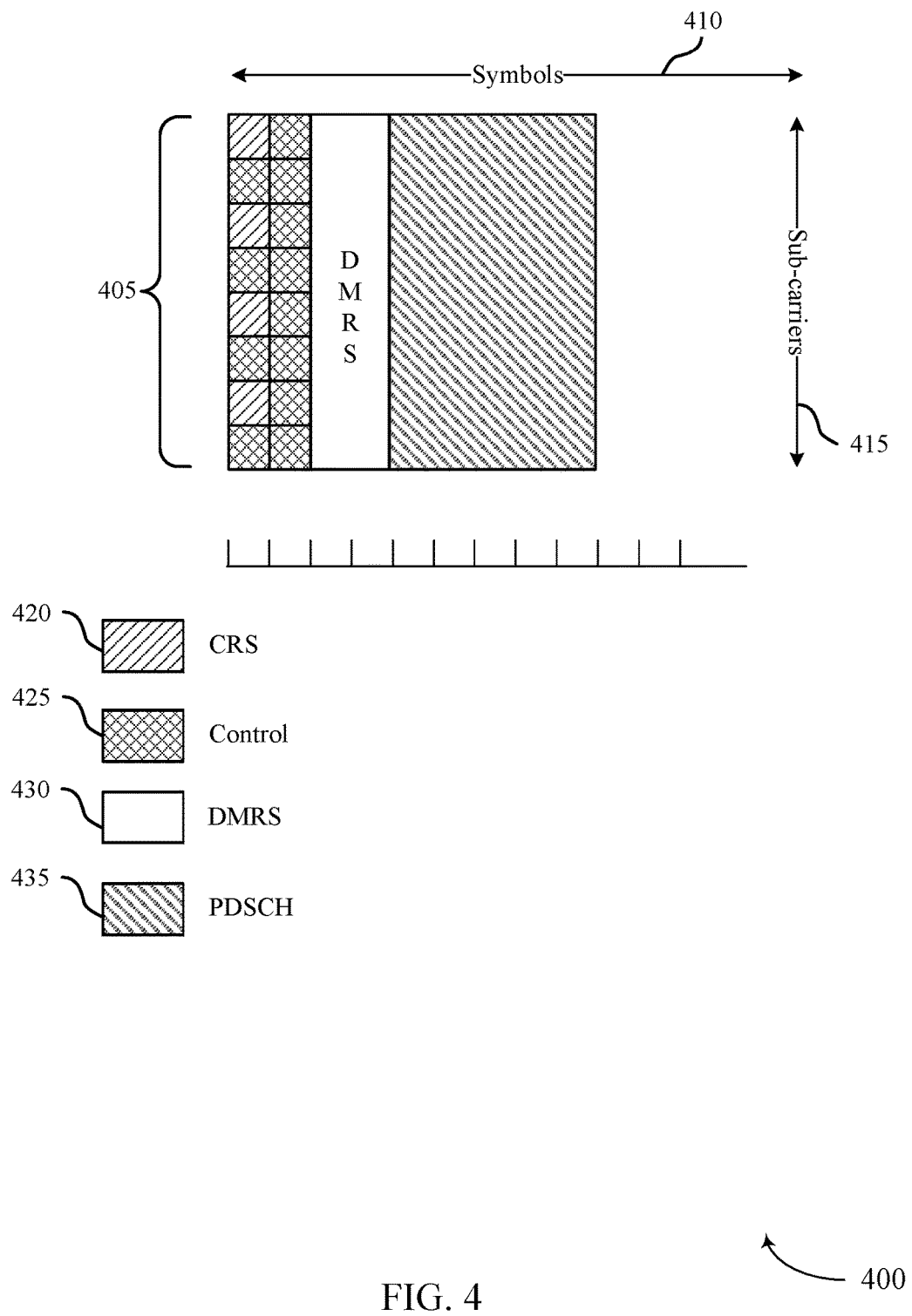
FIG. 4 illustrates another example of a CRS and control channel configuration in accordance with aspects of the present disclosure.

As indicated above, various aspects of the disclosure provide for dynamic CRS configuration. FIG. 4 illustrates an example of a CRS and control channel configuration 400 in accordance with aspects of the present disclosure. In some examples, a subframe 405 may have a CRS and control channel configuration that is selected by a network access device such as a base station 105 of FIGS. 1-2, for transmission to a UE such as a UE 115 of FIGS. 1-2.

The subframe 405 of this example, may span a number of symbols 410 and be transmitted using a number of sub-carriers 415. Within a first symbol of the subframe, CRS transmissions 420 and control channel transmissions 425 may be concurrently transmitted using FDM. A demodulation reference signal (DMRS) 430 may be transmitted following the CRS 420 and control channel 425 transmissions, followed by downlink data such as PDSCH transmissions 435. In this example, within the first symbol of the subframe 405 the CRS 420 occupies one-half of the symbol (e.g., every other frequency tone), with the remaining portion of the symbol used for control transmissions 425, such as L1 control channels (e.g. physical control format indicator channel (PCFICH), physical frame format indicator channel (PFFICH)), and PDCCH if sufficient resources are available. The second symbol of the subframe 405 may include control information 425 such as PDCCH transmissions. The power level for the CRS transmissions 420 and control transmissions 425 may be selected based on the channel conditions of a UE that is to receive the subframe 405.

In examples where a cell edge UE is to receive the subframe 405 and has a relatively poor channel quality, the CRS transmissions 420 in the first symbol may be power-boosted to assure reliable coverage for burst detection and control demodulation at the UE. In some cases, the amount of the power boost provided to the CRS transmissions 420 may be selected based on the channel quality of the UE, with a larger amount of boost provided to UEs with poorer channel conditions. In the event that the power boost to the CRS transmissions 420 reaches a maximum level, no additional power may be available for control transmissions 425 in the first symbol, and there is no PDCCH transmission in the first symbol. In some cases, some power may be reserved in the first symbol for transmissions of the L1 control channels, such that the L1 control channels of the control transmissions 425 and the CRS transmissions 420 may be transmitted, but no PDCCH transmissions may be transmitted in this first symbol.

In examples where a cell center UE is to receive the subframe 405 and has a relatively good channel quality, the CRS transmissions 420 in the first symbol may not be power-boosted, and PDCCH may be transmitted in control transmissions 425 of the first symbol. Accordingly, such a configuration technique may provide a configurable PDCCH starting symbol location, in which PDCCH starts from the first symbol for a cell center UE and starts from the second symbol for a cell edge UE. A particular configuration that is used by a base station may be signaled to the UE in a UE-specific manner, such as through L1 signaling or a search space restriction for the UE.

Figure 5:
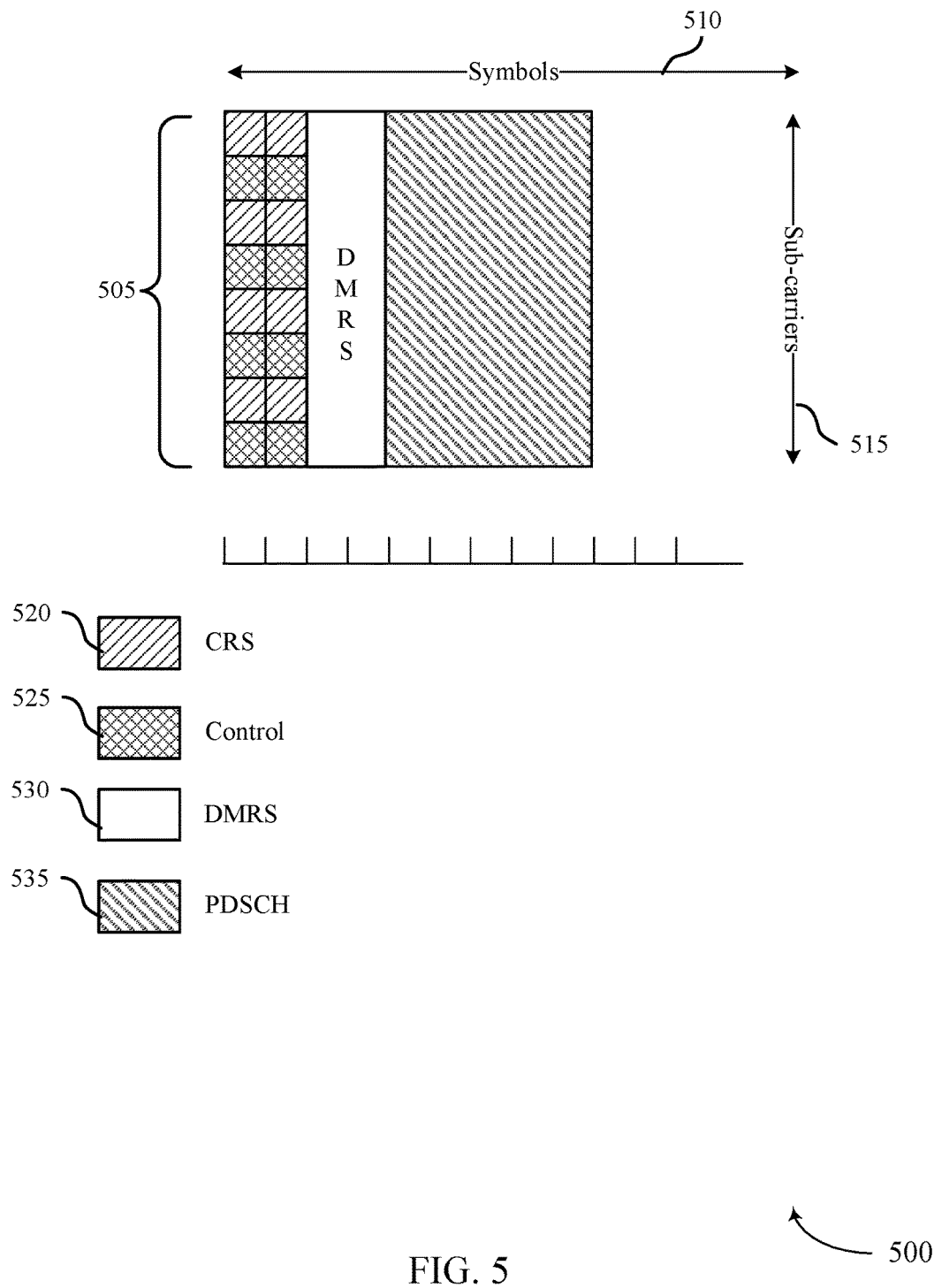
FIG. 5 illustrates another example of a CRS and control channel configuration in accordance with aspects of the present disclosure.

FIG. 5 illustrates an example of another a CRS and control channel configuration 500 in accordance with aspects of the present disclosure. In some examples, a subframe 505 may have a CRS and control channel configuration that is selected by a network access device such as a base station 105 of FIGS. 1-2, for transmission to a UE such as a UE 115 of FIGS. 1-2.

The subframe 505 of this example, similarly as discussed above, may span a number of symbols 510 and be transmitted using a number of sub-carriers 515. Within both a first symbol of the subframe 505 and a second symbol of the subframe 505, CRS transmissions 520 and control channel transmissions 525 may be concurrently transmitted using FDM. A DMRS 530 may be transmitted following the CRS 520 and control channel 525 transmissions, followed by downlink data such as PDSCH transmissions 535. In this example, within the first and second symbols of the subframe 505 the CRS 520 occupies one-half of the symbol (e.g., every other frequency tone), with the remaining portion of the symbol used for control transmissions 525, such as L1 control channels (e.g. PCFICH, PFFICH), and PDCCH.

In this example, power boosting of the CRS transmissions 520 may not be provided, and cell edge UEs may be allowed to combine CRS over the two symbols for reliable coverage and burst detection. Cell center UEs in such examples may rely on one symbol CRS. In some cases, the first and second symbols may be beamformed differently to target different UEs or sets of UEs. For example, in mmWave systems or systems that use CoMP with UEs specifically beamformed, CRS may be beamformed to provide enhanced reception at the UE(s). Combining CRS from both the first and second symbols may impact a UE processing timeline associated with the subframe 505, and in some examples a base station pay provide signaling that indicates whether the UE should combine CRS across two symbols or use one symbol CRS.

In other examples, a L1 signal in control transmissions 525 of the first symbol (e.g. PCFICH) may indicate a number of control symbols. For example, either one or both of the first two symbols of subframe 505 may be used for CRS transmissions 520 and control transmissions 525. If only a single symbol is used, the DMRS transmissions 530 and PDSCH transmissions 535 may start at the second symbol. If both the first symbol and the second symbol are used for CRS transmissions 520 and control transmissions 525, signaling may be provided to indicate whether CRS transmissions 520 are present on the second symbol and should be combined with first symbol CRS transmissions 520.

Figure 6:
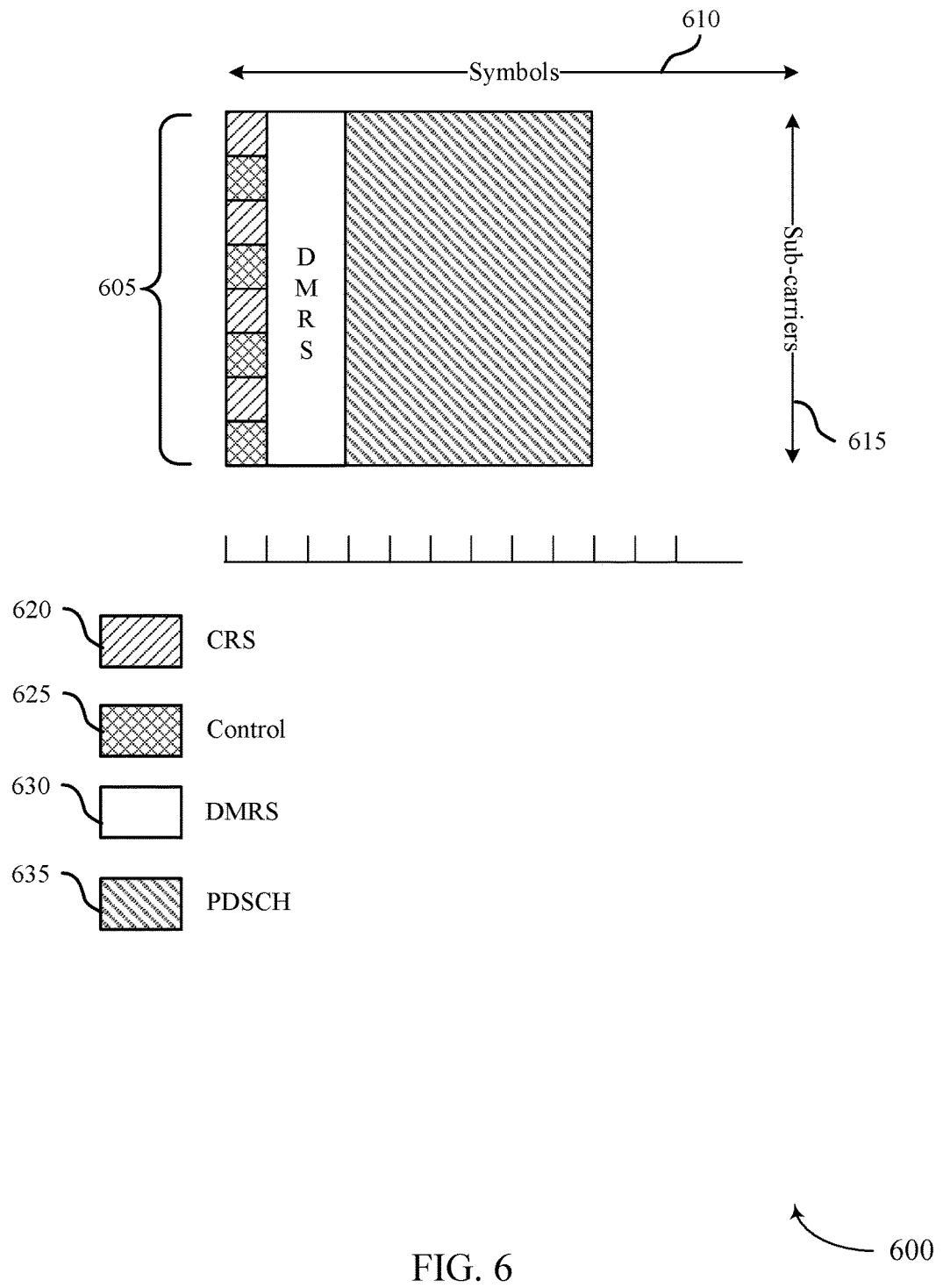
FIG. 6 illustrates another example of a CRS and control channel configuration in accordance with aspects of the present disclosure.

FIG. 6 illustrates an example of a CRS and control channel configuration 600 in accordance with aspects of the present disclosure, in which only a single symbol is used for CRS and control transmissions. Similarly as discussed above, a subframe 605 may have a CRS and control channel configuration that is selected by a network access device such as a base station 105 of FIGS. 1-2, for transmission to a UE such as a UE 115 of FIGS. 1-2.

The subframe 605 of this example may span a number of symbols 610 and be transmitted using a number of sub-carriers 615. In this example, a first symbol of the subframe 605 may include CRS transmissions 620 and control channel transmissions 625 concurrently transmitted using FDM. A DMRS 630 may be transmitted starting in the second symbol, followed by downlink data such as PDSCH transmissions 635. As indicated above, in such an example, an L1 signal within control transmissions 625 (e.g., PCFICH) can indicate the number of control symbols (one in this case), which a UE may use to determine that both CRS transmissions 620 and control transmissions 625, which include PDCCH, are located in the first symbol, and that DMRS/PDSCH start at the second symbol. If the L1 signaling indicates that two symbols are used for CRS transmissions 620 and control transmissions 625, than a configuration such as illustrated in FIG. 4 (e.g., if PCFICH on the first symbol indicates two control symbols and no CRS in the second symbol) or FIG. 5 (e.g., if PCFICH on the first symbol indicates two control symbols and CRS is in the second symbol) may be used.

Figure 7:
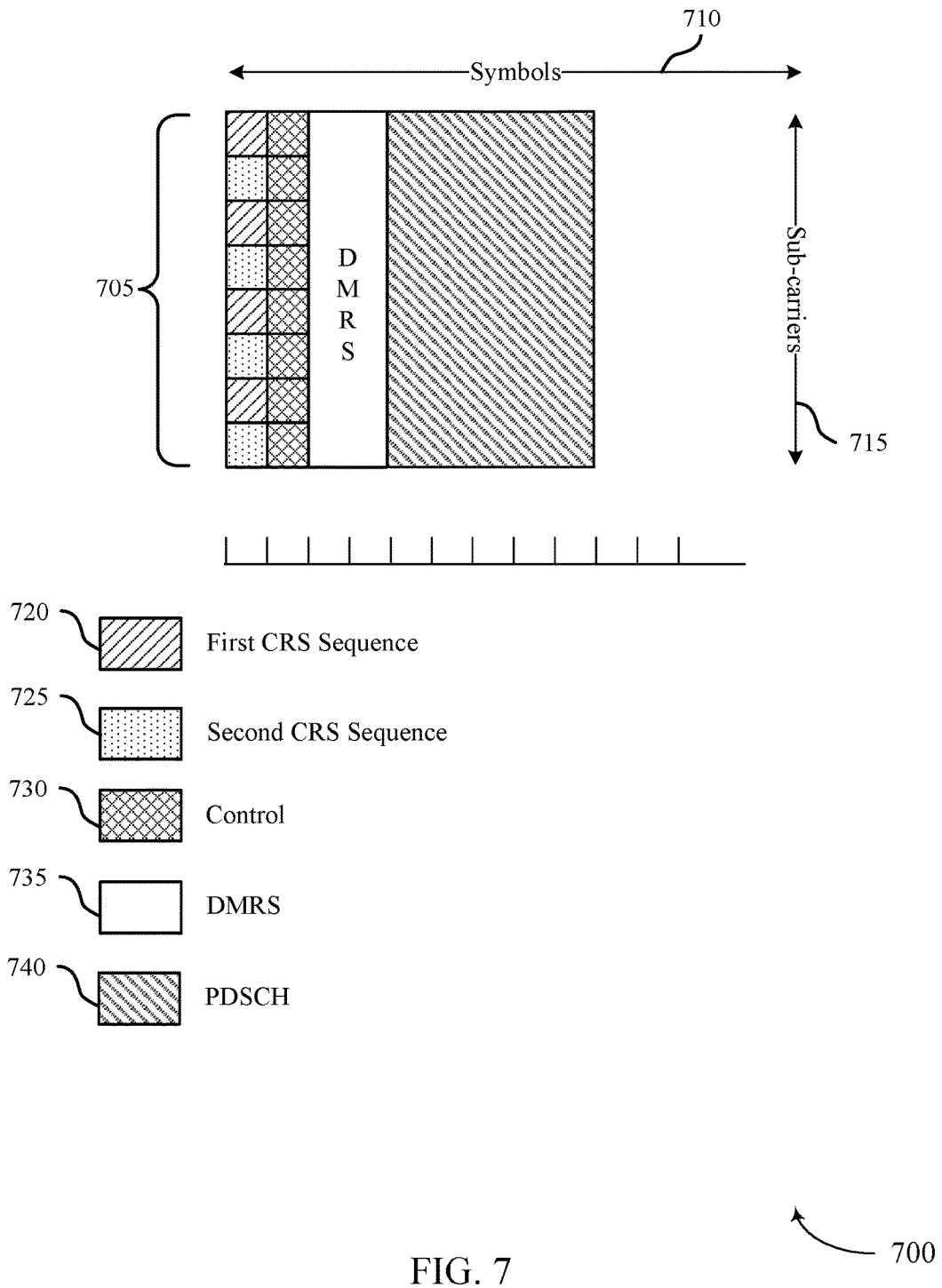
FIG. 7 illustrates another example of a CRS and control channel configuration in accordance with aspects of the present disclosure.

FIG. 7 illustrates an example of another a CRS and control channel configuration 700 in accordance with aspects of the present disclosure. In some examples, similarly as above, a subframe 705 may have a CRS and control channel configuration that is selected by a network access device such as a base station 105 of FIGS. 1-2, for transmission to a UE such as a UE 115 of FIGS. 1-2.

The subframe 705 of this example, similarly as discussed above, may span a number of symbols 710 and be transmitted using a number of sub-carriers 715. Within both a first symbol of the subframe 705 and a second symbol of the subframe 705, a first CRS sequence 720, a second CRS sequence 725, and control transmissions 730 may be transmitted. In this example, first CRS sequence 720 and a second CRS sequence 725 may be concurrently transmitted using FDM in the first symbol, and control transmissions 730 may be transmitted in the second symbol. A DMRS 735 may be transmitted, followed by downlink data such as PDSCH transmissions 740. In this example, within the first symbol of the subframe 705 the first CRS sequence 720 occupies one-half of the symbol (e.g., every other frequency tone), with the remaining portion of the symbol used for the second CRS sequence. Control transmissions 730 may be in the second symbol of the subframe 705.

In examples where the UE has relatively poor channel quality, the first CRS sequence 720 and second CRS sequence 725 may be used for control channel demodulation and burst detection. If a UE has relatively good channel quality, in some examples, only the first CRS sequence 720 (or only the second CRS sequence 725) may be transmitted, with remaining portions of the first symbol containing control transmissions 730 in a configuration such as illustrated in FIG. 4. In such examples, a UE may perform blind detection using two hypotheses to identify if just the first CRS sequence 720 is transmitted, or if a combined first CRS sequence 720 and second CRS sequence 725 are transmitted. Based on the outcome of the blind detection, the UE may determine whether the first symbol includes control transmissions 730 and whether PDCCH starts with the first symbol or the second symbol.

Figure 8:
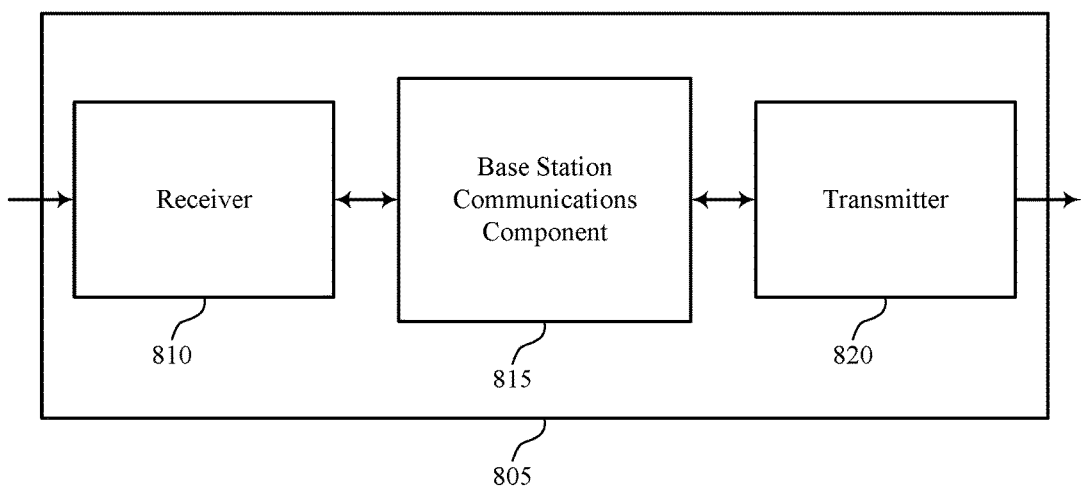
FIGS. 8 through 10 show block diagrams of a device that supports CRS and control channel configuration in wireless communications in accordance with aspects of the present disclosure.

FIG. 8 shows a block diagram 800 of a device 805 that supports CRS and control channel configuration in wireless communications in accordance with various aspects of the present disclosure. Device 805 may be an example of aspects of a base station 105 as described with reference to FIGS. 1-2. Device 805 may include receiver 810, base station communications component 815, and transmitter 820. Device 805 may also include a processor. Each of these components may be in communication with one another (e.g., via one or more buses).

Receiver 810 may receive information such as packets, user data, or control information associated with various information channels (e.g., control channels, data channels, and information related to CRS and control channel configuration in wireless communications, etc.). Information may be passed on to other components of the device. The receiver 810 may be an example of aspects of the transceiver 1135 described with reference to FIG. 11.

Base station communications component 815 may be an example of aspects of the base station communications component 1115 described with reference to FIG. 11. Base station communications component 815 may identify at least a first UE that is to receive a downlink transmission during a first TTI, identify a channel quality of the first UE, and configure a CRS based on the channel quality of the first UE.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas. Transmitter 820 may transmit the CRS to the first UE during the first TTI and also transmit CRS to a second UE during a second TTI.

Figure 9:
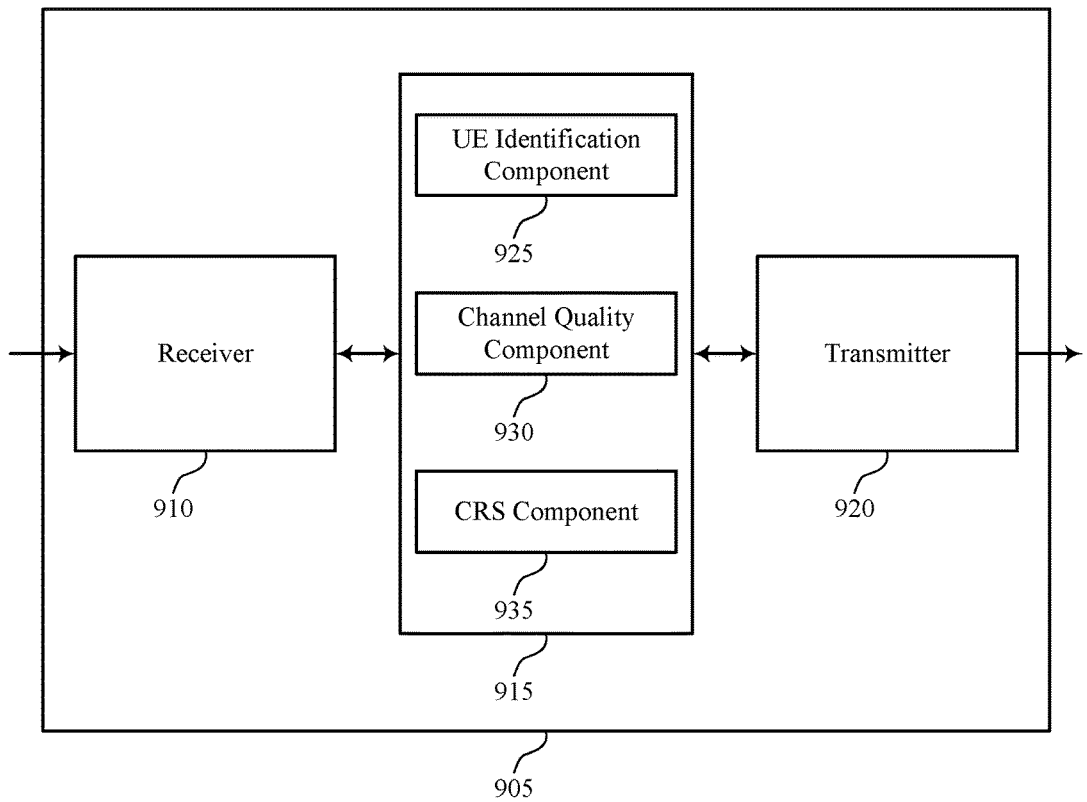

FIG. 9 shows a block diagram 900 of a device 905 that supports CRS and control channel configuration in wireless communications in accordance with various aspects of the present disclosure. Device 905 may be an example of aspects of a device 805 or a base station 105 as described with reference to FIGS. 1-2 and 8. Device 905 may include receiver 910, base station communications component 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to CRS and control channel configuration in wireless communications, etc.). Information may be passed on to other components of the device. The receiver 910 may be an example of aspects of the transceiver 1135 described with reference to FIG. 11.

Base station communications component 915 may be an example of aspects of the base station communications component 1115 described with reference to FIG. 11. Base station communications component 915 may also include UE identification component 925, channel quality component 930, and CRS component 935.

UE identification component 925 may identify at least a first UE that is to receive a downlink transmission during a first TTI and identify a second UE that is to receive a downlink transmission during a second TTI. Channel quality component 930 may identify a channel quality of the first UE and identify a channel quality of the second UE. Channel quality may be identified, in some examples, based on a CQI provided by the UEs, a SRS received from the UEs, a RSRP of the UEs, a RSRQ of the UEs, or any combination thereof. CRS component 935 may configure a CRS for the first TTI based on the channel quality of the first UE and configure a CRS for the second TTI based on the channel quality of the second UE.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
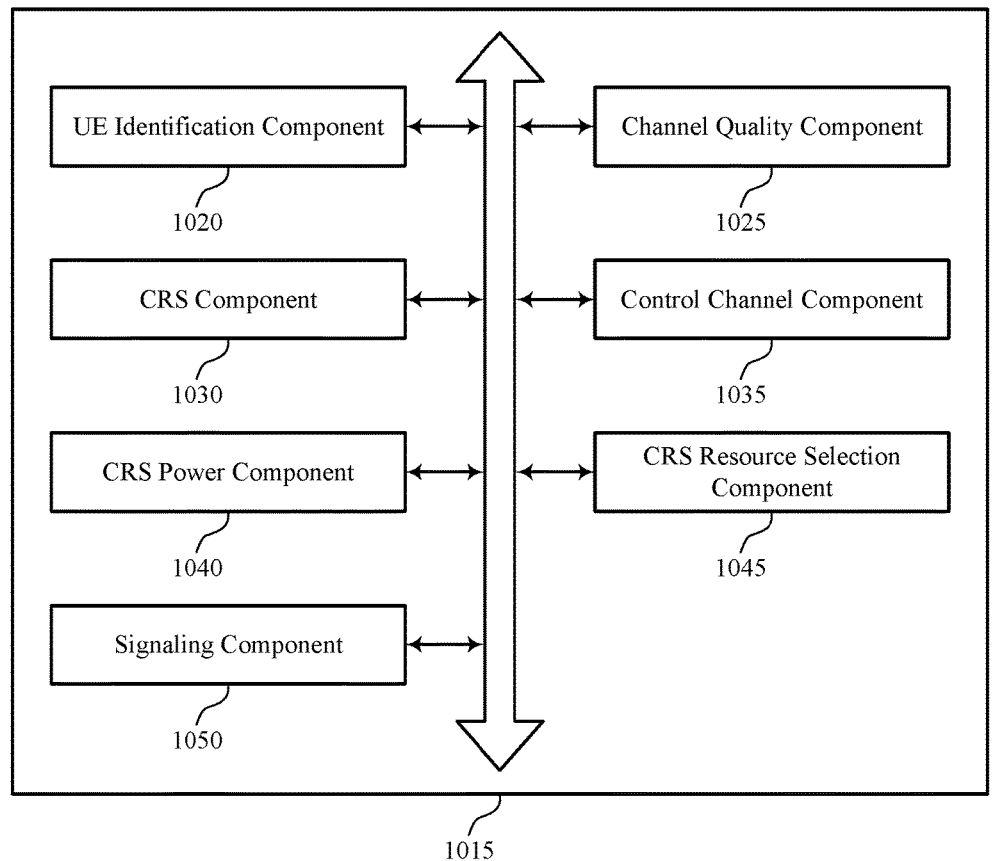

FIG. 10 shows a block diagram 1000 of a base station communications component 1015 that supports CRS and control channel configuration in wireless communications in accordance with various aspects of the present disclosure. The base station communications component 1015 may be an example of aspects of a base station communications component 815, a base station communications component 915, or a base station communications component 1115 described with reference to FIGS. 8, 9, and 11. The base station communications component 1015 may include UE identification component 1020, Channel quality component 1025, CRS component 1030, control channel component 1035, CRS power component 1040, CRS resource selection component 1045, and signaling component 1050. Each of these modules may communicate, directly or indirectly, with one another (e.g., via one or more buses).

UE identification component 1020 may identify at least a first UE that is to receive a downlink transmission during a first TTI and identify a second UE that is to receive a downlink transmission during a second TTI. Channel quality component 1025 may identify a channel quality of the first UE and identify a channel quality of the second UE. Channel quality may be identified, in some examples, based on a CQI provided by the UEs, a SRS received from the UEs, a RSRP of the UEs, a RSRQ of the UEs, or any combination thereof. CRS component 1030 may configure a CRS for the first TTI based on the channel quality of the first UE and configure a CRS for the second TTI based on the channel quality of the second UE.

Control channel component 1035 may configure a starting point for a downlink control channel transmission to the first UE within the TTI based on the CRS for the TTI. In some examples, a subset of REs of a symbol of a TTI may be configured for CRS, and a second subset of the REs may be configured for downlink control channel transmission. The control channel component 1035 may configure a concurrent downlink control channel transmission and CRS transmission in different subsets of resources of the first symbol when the channel quality of the first UE exceeds a threshold value. In some cases, the downlink control channel transmission is deferred to a second symbol of the TTI after the first symbol when a second power for the second subset of REs is below a power threshold value. In some cases, the CRS and control channel configuration may be dynamically configured for each TTI of a plurality of TTIs based at least in part on the channel quality of one or more UEs to receive the downlink transmission during the TTI.

CRS power component 1040 may configure CRS transmission power based on the channel quality of the first UE, and configure a concurrent downlink control channel transmission power based on the CRS transmission power. In some cases, in a first symbol, a first power for a first subset of REs may be configured based on the channel quality of the first UE, and a second power for a second subset of REs configured based on the first power. In some cases, the first power for the first subset of REs is configured with a higher power than the second power for the second subset of REs when the channel quality of the first UE is below a threshold value. In some cases, the first power for the first subset of REs is configured with equivalent power as the second power for the second subset of REs when the channel quality of the first UE is above a threshold value.

CRS resource selection component 1045 may select CRS resources for transmissions to a UE. In some cases, two sets of CRS resources may be provided, and the CRS resource selection component 1045 may configure a first CRS for transmission in a first subset of resources of a first symbol, and may configure a second CRS for transmission in a second subset of resources of the first symbol when the channel quality of the first UE does not exceed the threshold value. In some cases, each of a first symbol of the TTI and a second symbol of the TTI include a set of resource elements (REs), and where the configuring the CRS includes: configuring a first subset of the REs across the first symbol and second symbol for transmission of the CRS. In some cases, the configuring the CRS includes configuring a first CRS for transmission in a first subset of resources of a first symbol of the TTI based on the channel quality of the first UE. In some cases, the configuring the CRS further includes determining whether the channel quality of the first UE exceeds a threshold value.

Signaling component 1050 may transmit signaling to the first UE that indicates whether the PDCCH transmission starts in the first symbol or in the second symbol based on the channel quality of the UE. In some cases, signaling component 1050 may transmit signaling to the first UE that the first UE is to receive the CRS transmitted in the first symbol or that the first UE is to combine the CRS transmissions from the first symbol and the second symbol. In some cases, the signaling includes L1 signaling transmitted in the first symbol or a search space restriction for the first UE.

Figure 11:
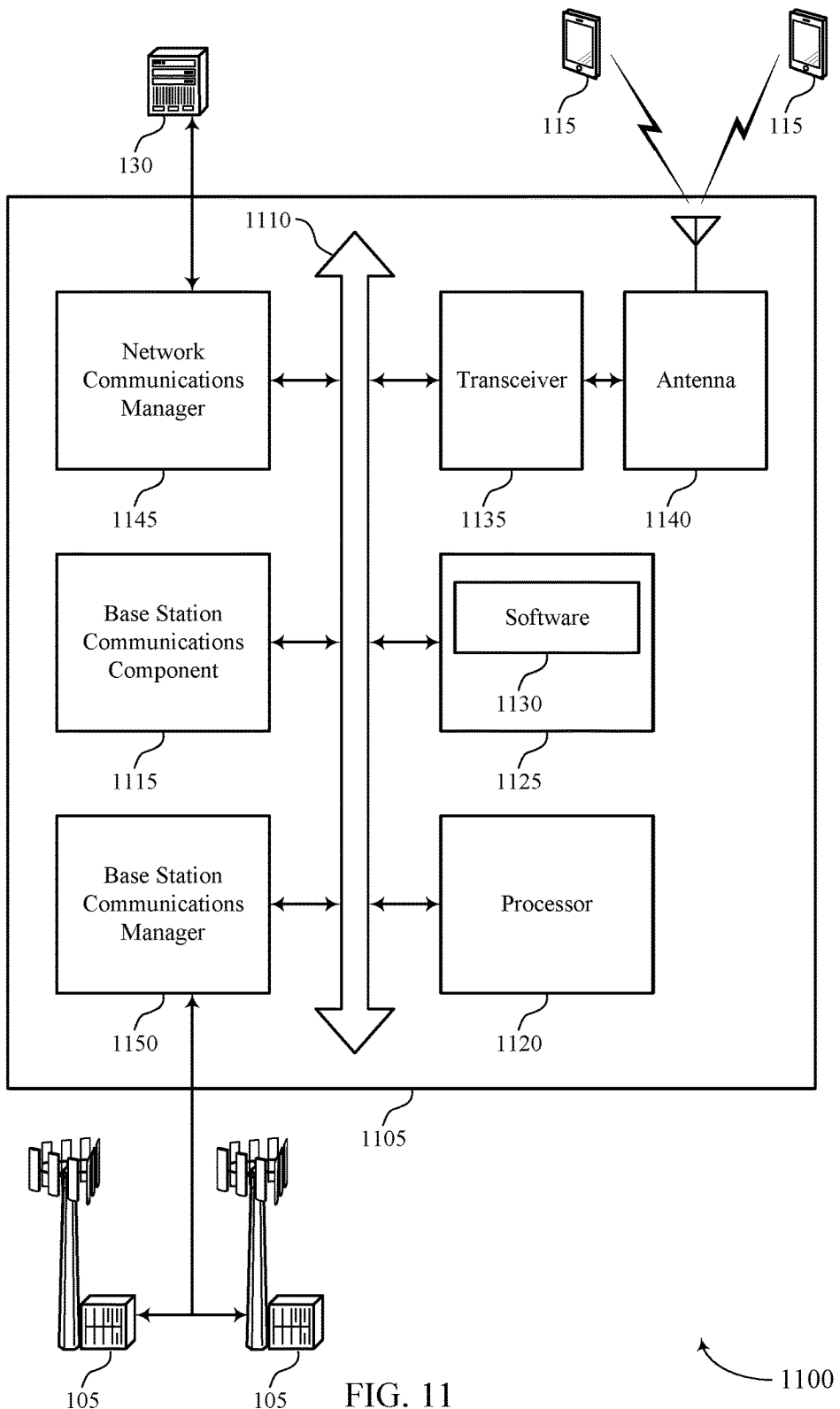
FIG. 11 illustrates a block diagram of a system including a base station that supports CRS and control channel configuration in wireless communications in accordance with aspects of the present disclosure.

FIG. 11 shows a diagram of a system 1100 including a device 1105 that supports CRS and control channel configuration in wireless communications in accordance with various aspects of the present disclosure. Device 1105 may be an example of or include the components of device 805, device 905, or a base station 105 as described above, e.g., with reference to FIGS. 1, 8 and 9. Device 1105 may include components for bi-directional voice and data communications including components for transmitting and receiving communications, including base station communications component 1115, processor 1120, memory 1125, software 1130, transceiver 1135, antenna 1140, network communications manager 1145, and base station communications manager 1150. These components may be in electronic communication via one or more busses (e.g., bus 1110). Device 1105 may communicate wirelessly with one or more UEs 115. Base station communications component 1115 may be an example of aspects of the base station communications component described with reference to FIGS. 1-2 and 8-10.

Processor 1120 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting CRS and control channel configuration in wireless communications).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support CRS and control channel configuration in wireless communications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Base station communications manager 1150 may manage communications with other base station 105, and may include a controller or scheduler for controlling communications with UEs 115 in cooperation with other base stations 105. For example, the base station communications manager 1150 may coordinate scheduling for transmissions to UEs 115 for various interference mitigation techniques such as beamforming or joint transmission. In some examples, base station communications manager 1150 may provide an X2 interface within an Long Term Evolution (LTE)/LTE-A wireless communication network technology to provide communication between base stations 105.

Figure 12:
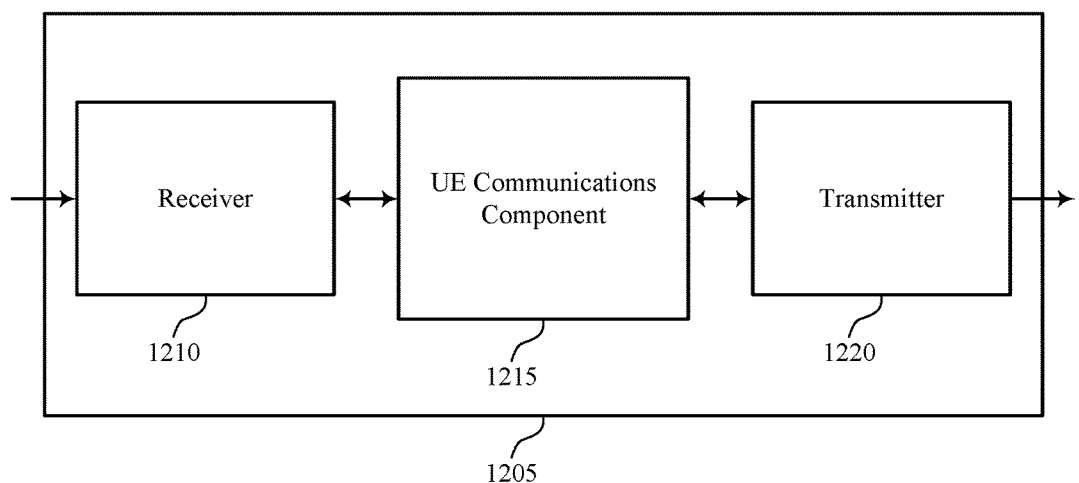
FIGS. 12 through 14 show block diagrams of a device that supports CRS and control channel configuration in wireless communications in accordance with aspects of the present disclosure.

FIG. 12 shows a block diagram 1200 of a device 1205 that supports CRS and control channel configuration in wireless communications in accordance with various aspects of the present disclosure. Device 1205 may be an example of aspects of a UE 115 as described with reference to FIGS. 1-2. Device 1205 may include receiver 1210, UE communications component 1215, and transmitter 1220. Device 1205 may also include a processor. Each of these components may be in communication with one another (e.g., via one or more buses).

Receiver 1210 may receive information such as packets, user data, or control information associated with various information channels (e.g., control channels, data channels, and information related to CRS and control channel configuration in wireless communications, etc.). Information may be passed on to other components of the device. The receiver 1210 may be an example of aspects of the transceiver 1535 described with reference to FIG. 15. Receiver 1210 may receive, at a UE, a downlink transmission from a base station during a first TTI.

UE communications component 1215 may be an example of aspects of the UE communications component 1515 described with reference to FIG. 15. UE communications component 1215 may determine a CRS configuration of the downlink transmission and receive the CRS based on the CRS configuration.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
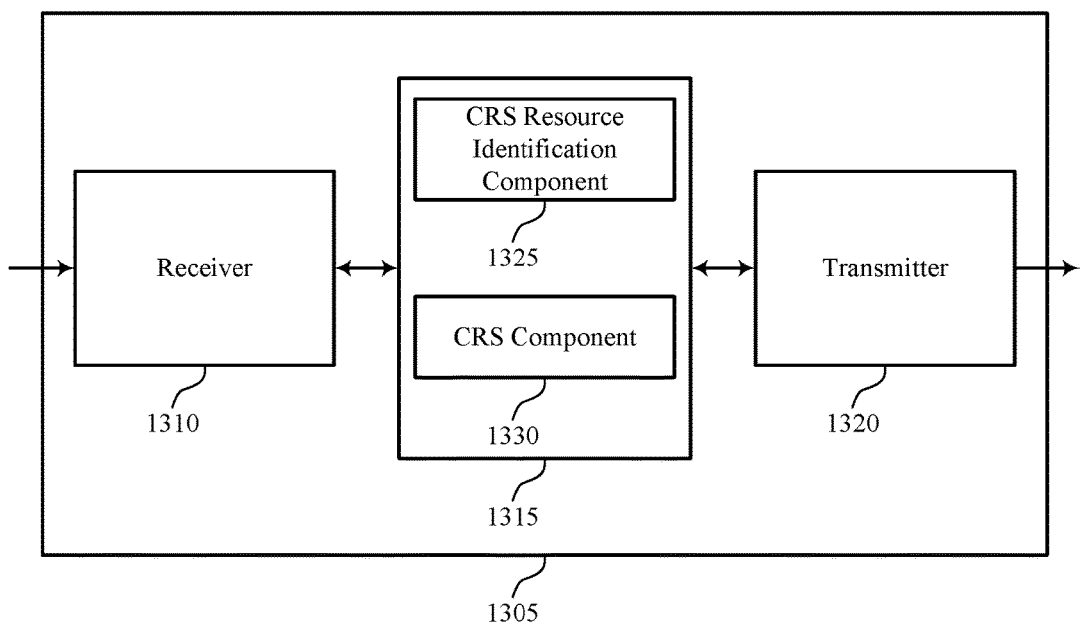

FIG. 13 shows a block diagram 1300 of a device 1305 that supports CRS and control channel configuration in wireless communications in accordance with various aspects of the present disclosure. Device 1305 may be an example of aspects of a device 1205 or a UE 115 as described with reference to FIGS. 1 and 12. Device 1305 may include receiver 1310, UE communications component 1315, and transmitter 1320. Device 1305 may also include a processor. Each of these components may be in communication with one another (e.g., via one or more buses).

Receiver 1310 may receive information such as packets, user data, or control information associated with various information channels (e.g., control channels, data channels, and information related to CRS and control channel configuration in wireless communications, etc.). Information may be passed on to other components of the device. The receiver 1310 may be an example of aspects of the transceiver 1535 described with reference to FIG. 15.

UE communications component 1315 may be an example of aspects of the UE communications component 1515 described with reference to FIG. 15. UE communications component 1315 may also include CRS resource identification component 1325 and CRS component 1330.

CRS resource identification component 1325 may determine a CRS configuration of the downlink transmission, receive signaling from the base station that indicates whether only a first symbol of the TTI or both the first symbol and a second symbol of the TTI include CRS and downlink control information, and, when both the first symbol and the second symbol include CRS and downlink control information, whether the second symbol includes CRS transmissions. In some cases, CRS resource identification component 1325 may determine the CRS configuration by blindly detecting the presence of a first or a second CRS sequence. In some cases, the determining the CRS configuration includes determining that a first CRS is configured for transmission in a first subset of resources of a first symbol of the TTI.

CRS component 1330 may receive the CRS based on the CRS configuration. In some cases, each of a first symbol of the TTI and a second symbol of the TTI include a portion of the CRS transmission, and where the receiving the CRS includes: combining CRS transmissions received in the first symbol and second symbol.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
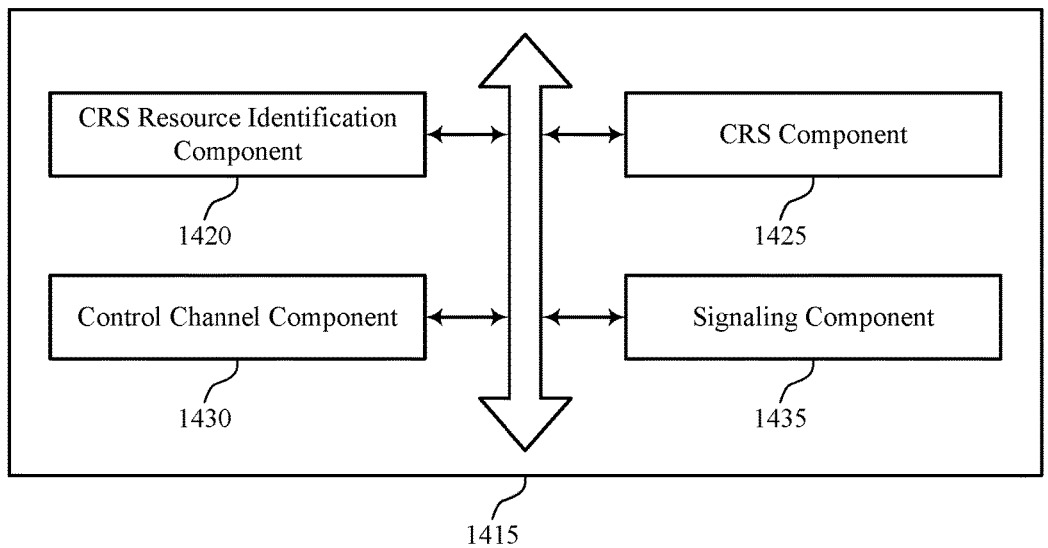

FIG. 14 shows a block diagram 1400 of a UE communications component 1415 that supports CRS and control channel configuration in wireless communications in accordance with various aspects of the present disclosure. The UE communications component 1415 may be an example of aspects of a UE communications component 1515 described with reference to FIGS. 12, 13, and 15. The UE communications component 1415 may include CRS resource identification component 1420, CRS component 1425, control channel component 1430, and signaling component 1435. Each of these modules may communicate, directly or indirectly, with one another (e.g., via one or more buses).

CRS resource identification component 1420 may determine a CRS configuration of the downlink transmission, and receive signaling from the base station that indicates whether only a first symbol of the TTI or both the first symbol and a second symbol of the TTI include CRS and downlink control information. In some cases, when both the first symbol and the second symbol include CRS and downlink control information, the CRS resource identification component 1420 may determine whether the second symbol includes CRS transmissions. In some cases, the CRS resource identification component 1420 may blindly detect the presence of a first CRS sequence or a second CRS sequence.

CRS component 1425 may receive the CRS based on the CRS configuration. In some cases, each of a first symbol of the TTI and a second symbol of the TTI include a portion of the CRS transmission, and the receiving the CRS includes combining CRS transmissions received in the first symbol and second symbol. Control channel component 1430 may determine a starting point for a downlink control channel transmission within the TTI based on the CRS configuration.

Signaling component 1435 may receive signaling that indicates a starting point for a PDCCH based on the CRS configuration and receive signaling that the CRS transmissions from the first symbol and the second symbol are to be combined. In some cases, the signaling includes L1 signaling transmitted in a first symbol of the TTI or a search space restriction for the first UE.

Figure 15:
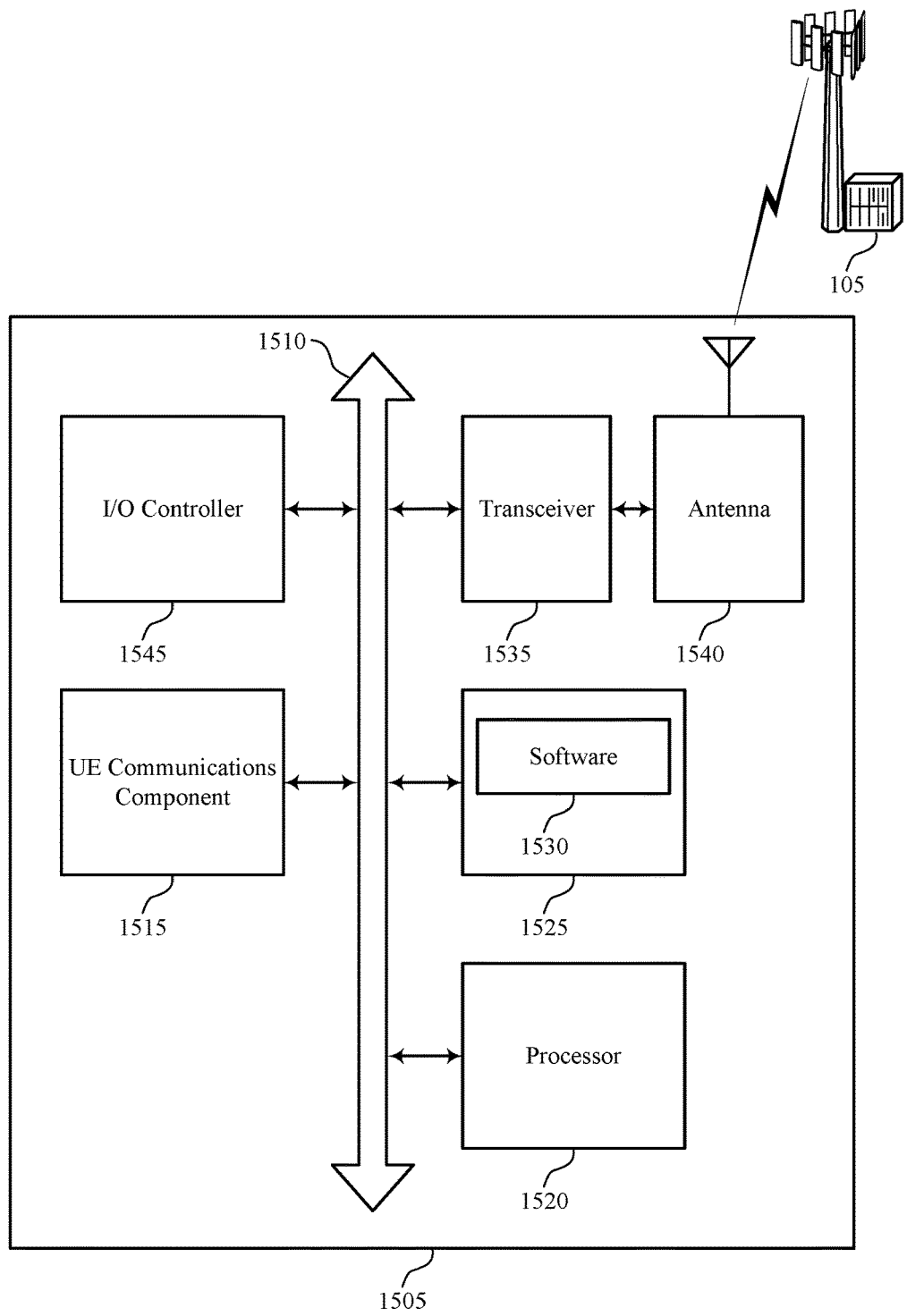
FIG. 15 illustrates a block diagram of a system including a UE that supports CRS and control channel configuration in wireless communications in accordance with aspects of the present disclosure.

FIG. 15 shows a diagram of a system 1500 including a device 1505 that supports CRS and control channel configuration in wireless communications in accordance with various aspects of the present disclosure. Device 1505 may be an example of or include the components of UE 115 as described above, e.g., with reference to FIG. 1. Device 1505 may include components for bi-directional voice and data communications including components for transmitting and receiving communications, including UE communications component 1515, processor 1520, memory 1525, software 1530, transceiver 1535, antenna 1540, and I/O controller 1545. These components may be in electronic communication via one or more busses (e.g., bus 1510). Device 1505 may communicate wirelessly with one or more base stations 105. UE communications component 1515 may be an example of aspects of the UE communications component described with reference to FIGS. 1-2 and 12-14.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting CRS and control channel configuration in wireless communications).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support CRS and control channel configuration in wireless communications. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system.

Figure 16:
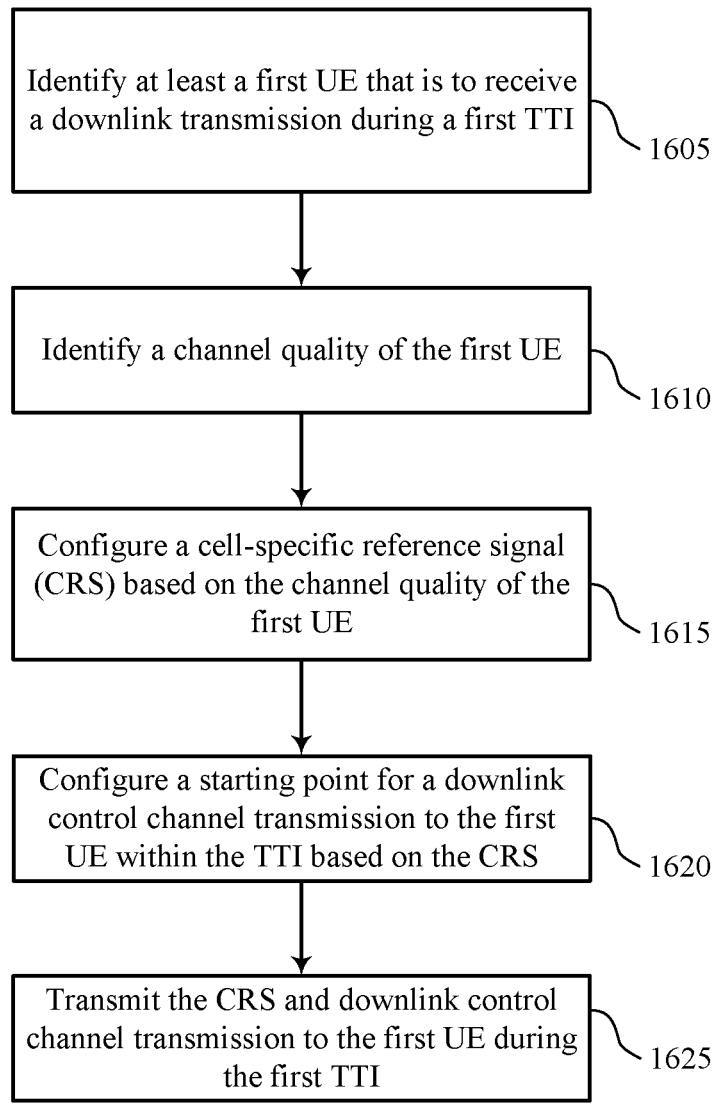
FIGS. 16 through 20 illustrate methods for CRS and control channel configuration in wireless communications in accordance with aspects of the present disclosure.

FIG. 16 shows a flowchart illustrating a method 1600 for CRS and control channel configuration in wireless communications in accordance with various aspects of the present disclosure. The operations of method 1600 may be implemented by a base station 105 or its components as described herein. For example, the operations of method 1600 may be performed by a base station communications component as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1605 the base station 105 may identify at least a first UE that is to receive a downlink transmission during a first TTI. The operations of block 1605 may be performed according to the methods described with reference to FIGS. 1 through 7. In certain examples, aspects of the operations of block 1605 may be performed by a UE identification component as described with reference to FIGS. 8 through 11.

At block 1610 the base station 105 may identify a channel quality of the first UE. The operations of block 1610 may be performed according to the methods described with reference to FIGS. 1 through 7. In certain examples, aspects of the operations of block 1610 may be performed by a channel quality component as described with reference to FIGS. 8 through 11.

At block 1615 the base station 105 may configure a CRS based at least in part on the channel quality of the first UE. The operations of block 1615 may be performed according to the methods described with reference to FIGS. 1 through 7. In certain examples, aspects of the operations of block 1615 may be performed by a CRS component as described with reference to FIGS. 8 through 11.

At block 1620 the base station 105 may configure a starting point for a downlink control channel transmission to the first UE within the TTI based on the CRS. The operations of block 1620 may be performed according to the methods described with reference to FIGS. 1 through 7. In certain examples, aspects of the operations of block 1620 may be performed by a control channel component as described with reference to FIGS. 8 through 11.

At block 1625 the base station 105 may transmit the CRS to the first UE during the first TTI. The operations of block 1625 may be performed according to the methods described with reference to FIGS. 1 through 7. In certain examples, aspects of the operations of block 1625 may be performed by a transmitter as described with reference to FIGS. 8 through 11. In some examples, the transmission may include an indication of a starting point within the TTI (e.g., within a first symbol or within a second symbol) for the control channel transmission. Such a transmission may include an indication, for example, in L1 signaling within the first symbol that may be received by the first UE and used to determine where the control channel transmission begins.

Figure 17:
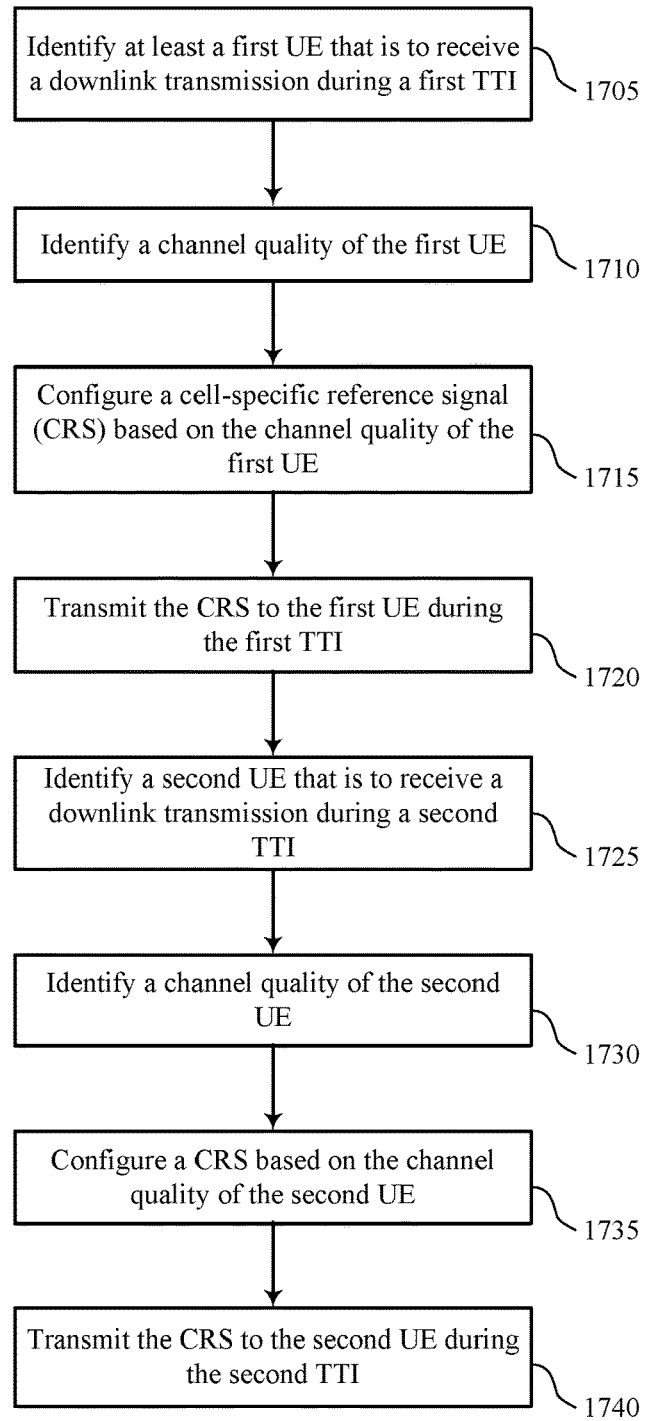

FIG. 17 shows a flowchart illustrating a method 1700 for CRS and control channel configuration in wireless communications in accordance with various aspects of the present disclosure. The operations of method 1700 may be implemented by a base station 105 or its components as described herein. For example, the operations of method 1700 may be performed by a base station communications component as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1705 the base station 105 may identify at least a first UE that is to receive a downlink transmission during a first TTI. The operations of block 1705 may be performed according to the methods described with reference to FIGS. 1 through 7. In certain examples, aspects of the operations of block 1705 may be performed by a UE identification component as described with reference to FIGS. 8 through 11.

At block 1710 the base station 105 may identify a channel quality of the first UE. The operations of block 1710 may be performed according to the methods described with reference to FIGS. 1 through 7. In certain examples, aspects of the operations of block 1710 may be performed by a channel quality component as described with reference to FIGS. 8 through 11.

At block 1715 the base station 105 may configure a CRS based at least in part on the channel quality of the first UE. The operations of block 1715 may be performed according to the methods described with reference to FIGS. 1 through 7. In certain examples, aspects of the operations of block 1715 may be performed by a CRS component as described with reference to FIGS. 8 through 11.

At block 1720 the base station 105 may transmit the CRS to the first UE during the first TTI. The operations of block 1720 may be performed according to the methods described with reference to FIGS. 1 through 7. In certain examples, aspects of the operations of block 1720 may be performed by a transmitter as described with reference to FIGS. 8 through 11.

At block 1725 the base station 105 may identify a second UE that is to receive a downlink transmission during a second TTI. The operations of block 1725 may be performed according to the methods described with reference to FIGS. 1 through 7. In certain examples, aspects of the operations of block 1725 may be performed by a UE identification component as described with reference to FIGS. 8 through 11.

At block 1730 the base station 105 may identify a channel quality of the second UE. The operations of block 1730 may be performed according to the methods described with reference to FIGS. 1 through 7. In certain examples, aspects of the operations of block 1730 may be performed by a channel quality component as described with reference to FIGS. 8 through 11.

At block 1735 the base station 105 may configure a CRS based at least in part on the channel quality of the second UE. The operations of block 1735 may be performed according to the methods described with reference to FIGS. 1 through 7. In certain examples, aspects of the operations of block 1735 may be performed by a CRS component as described with reference to FIGS. 8 through 11.

At block 1740 the base station 105 may transmit the CRS to the second UE during the second TTI. The operations of block 1740 may be performed according to the methods described with reference to FIGS. 1 through 7. In certain examples, aspects of the operations of block 1740 may be performed by a transmitter as described with reference to FIGS. 8 through 11.

Figure 18:
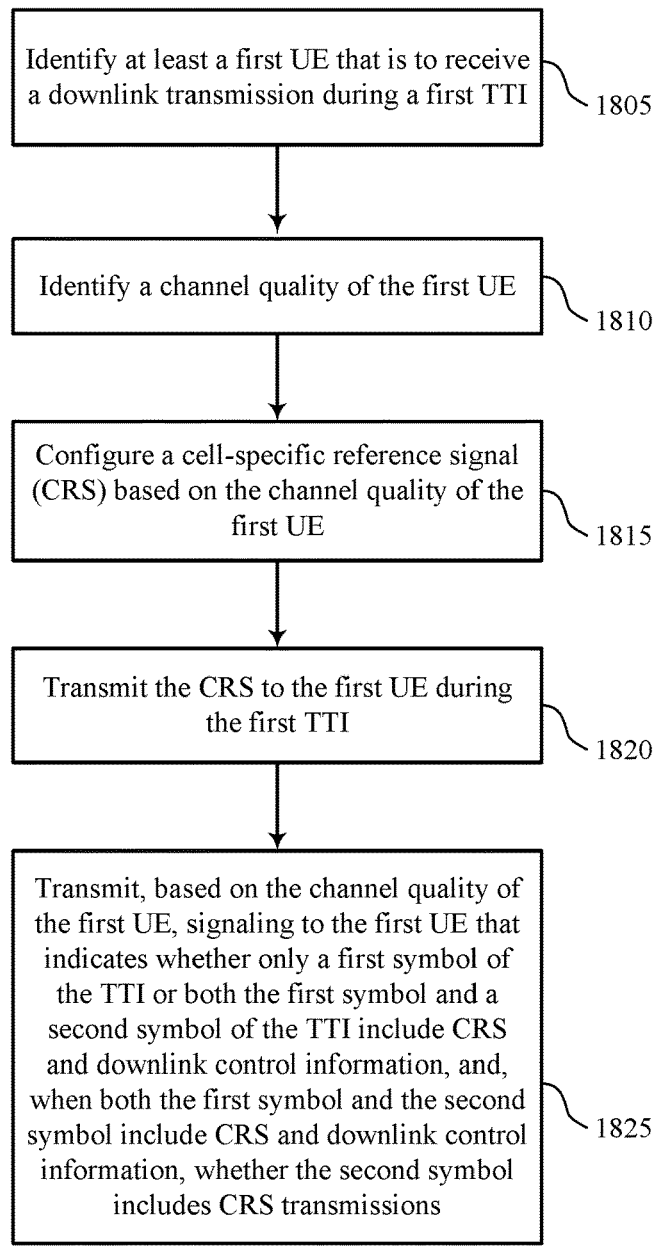

FIG. 18 shows a flowchart illustrating a method 1800 for CRS and control channel configuration in wireless communications in accordance with various aspects of the present disclosure. The operations of method 1800 may be implemented by a base station 105 or its components as described herein. For example, the operations of method 1800 may be performed by a base station communications component as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1805 the base station 105 may identify at least a first UE that is to receive a downlink transmission during a first TTI. The operations of block 1805 may be performed according to the methods described with reference to FIGS. 1 through 7. In certain examples, aspects of the operations of block 1805 may be performed by a UE identification component as described with reference to FIGS. 8 through 11.

At block 1810 the base station 105 may identify a channel quality of the first UE. The operations of block 1810 may be performed according to the methods described with reference to FIGS. 1 through 7. In certain examples, aspects of the operations of block 1810 may be performed by a channel quality component as described with reference to FIGS. 8 through 11.

At block 1815 the base station 105 may configure a CRS based at least in part on the channel quality of the first UE. The operations of block 1815 may be performed according to the methods described with reference to FIGS. 1 through 7. In certain examples, aspects of the operations of block 1815 may be performed by a CRS component as described with reference to FIGS. 8 through 11.

At block 1820 the base station 105 may transmit the CRS to the first UE during the first TTI. The operations of block 1820 may be performed according to the methods described with reference to FIGS. 1 through 7. In certain examples, aspects of the operations of block 1820 may be performed by a transmitter as described with reference to FIGS. 8 through 11.

At block 1825 the base station 105 may transmit, based at least in part on the channel quality of the first UE, signaling to the first UE that indicates whether only a first symbol of the TTI or both the first symbol and a second symbol of the TTI include CRS and downlink control information, and, when both the first symbol and the second symbol include CRS and downlink control information, whether the second symbol includes CRS transmissions. The operations of block 1825 may be performed according to the methods described with reference to FIGS. 1 through 7. In certain examples, aspects of the operations of block 1825 may be performed by a signaling component as described with reference to FIGS. 8 through 11.

Figure 19:
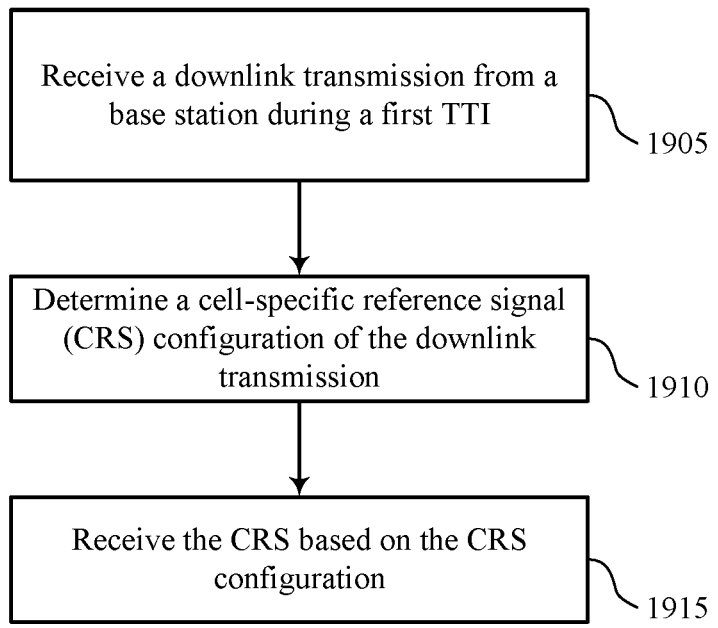

FIG. 19 shows a flowchart illustrating a method 1900 for CRS and control channel configuration in wireless communications in accordance with various aspects of the present disclosure. The operations of method 1900 may be implemented by a UE 115 or its components as described herein. For example, the operations of method 1900 may be performed by a UE communications component as described with reference to FIGS. 12 through 15. In some examples, a UE 115 may execute a set of codes to control the functional elements of the device to perform the functions described below. Additionally or alternatively, the UE 115 may perform aspects the functions described below using special-purpose hardware.

At block 1905 the UE 115 may receive, at a user equipment (UE), a downlink transmission from a base station during a first TTI. The operations of block 1905 may be performed according to the methods described with reference to FIGS. 1 through 7. In certain examples, aspects of the operations of block 1905 may be performed by a receiver as described with reference to FIGS. 12 through 15.

At block 1910 the UE 115 may determine a CRS configuration of the downlink transmission. The operations of block 1910 may be performed according to the methods described with reference to FIGS. 1 through 7. In certain examples, aspects of the operations of block 1910 may be performed by a CRS resource identification component as described with reference to FIGS. 12 through 15.

At block 1915 the UE 115 may receive the CRS based at least in part on the CRS configuration. The operations of block 1915 may be performed according to the methods described with reference to FIGS. 1 through 7. In certain examples, aspects of the operations of block 1915 may be performed by a CRS component as described with reference to FIGS. 12 through 15. In some examples, the UE 115 may also receive an indication of a starting point within the first TTI (e.g., within a first symbol of the first TTI or within a second symbol of the first TTI) for a control channel transmission. Such an indication may be received, for example, in L1 signaling within the first symbol and used to determine where the control channel transmission begins.

Figure 20:
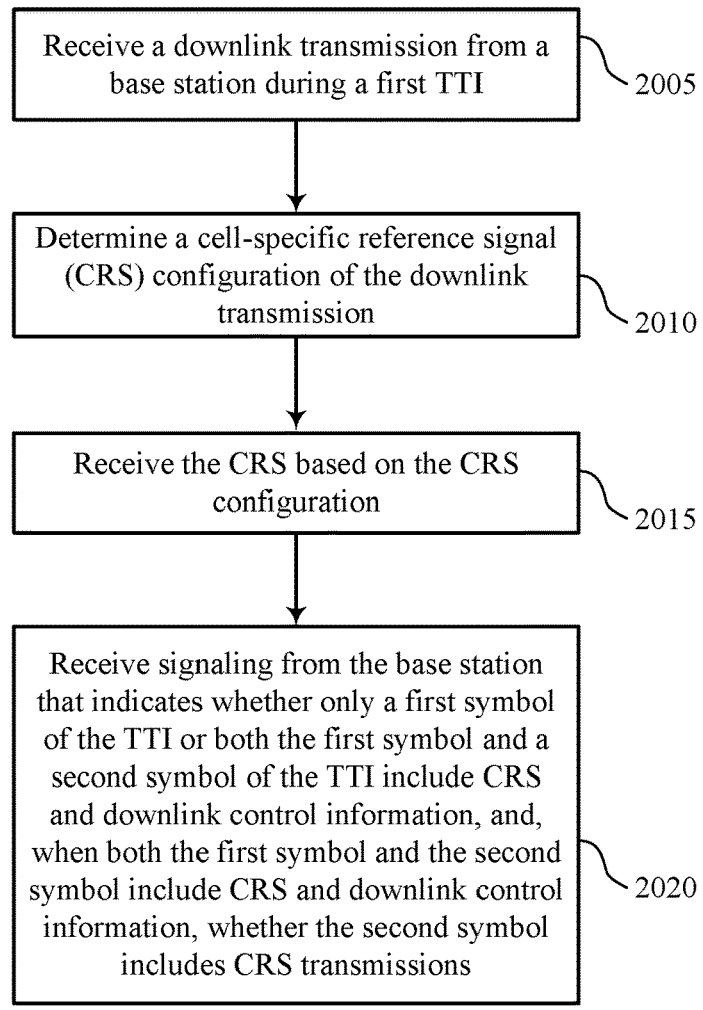

FIG. 20 shows a flowchart illustrating a method 2000 for CRS and control channel configuration in wireless communications in accordance with various aspects of the present disclosure. The operations of method 2000 may be implemented by a UE 115 or its components as described herein. For example, the operations of method 2000 may be performed by a UE communications component as described with reference to FIGS. 12 through 15. In some examples, a UE 115 may execute a set of codes to control the functional elements of the device to perform the functions described below. Additionally or alternatively, the UE 115 may perform aspects the functions described below using special-purpose hardware.

At block 2005 the UE 115 may receive a downlink transmission from a base station during a first TTI. The operations of block 2005 may be performed according to the methods described with reference to FIGS. 1 through 7. In certain examples, aspects of the operations of block 2005 may be performed by a receiver as described with reference to FIGS. 12 through 15.

At block 2010 the UE 115 may determine a CRS configuration of the downlink transmission. The operations of block 2010 may be performed according to the methods described with reference to FIGS. 1 through 7. In certain examples, aspects of the operations of block 2010 may be performed by a CRS resource identification component as described with reference to FIGS. 12 through 15.

At block 2015 the UE 115 may receive the CRS based at least in part on the CRS configuration. The operations of block 2015 may be performed according to the methods described with reference to FIGS. 1 through 7. In certain examples, aspects of the operations of block 2015 may be performed by a CRS component as described with reference to FIGS. 12 through 15.

At block 2020 the UE 115 may receive signaling from the base station that indicates whether only a first symbol of the TTI or both the first symbol and a second symbol of the TTI include CRS and downlink control information, and, when both the first symbol and the second symbol include CRS and downlink control information, whether the second symbol includes CRS transmissions. The operations of block 2020 may be performed according to the methods described with reference to FIGS. 1 through 7. In certain examples, aspects of the operations of block 2020 may be performed by a CRS resource identification component as described with reference to FIGS. 12 through 15.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNodeB (gNB) Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying at least a first user equipment (UE) that is to receive a downlink transmission during a first transmission time interval (TTI);
   identifying a channel quality of the first UE;
   configuring a cell-specific reference signal (CRS) to occupy a first subset of resource elements of an initial symbol within the first TTI;
   determining whether a downlink control channel transmission is to be transmitted in a second subset of resource elements of the initial symbol based at least in part on whether the channel quality of the first UE exceeds a threshold value, and wherein the downlink control channel transmission is deferred to a second symbol of the first TTI after the initial symbol when the channel quality of the first UE is at or below the threshold value; and transmitting the CRS and the downlink control channel transmission to the first UE during the first TTI.

2. The method of claim 1, wherein the configuring the CRS comprises: dynamically configuring the CRS for each TTI of a plurality of TTIs based at least in part on a channel quality of one or more UEs, including the first UE, to receive the downlink transmission during the respective TTI.

3. The method of claim 1, further comprising: configuring a starting point for the downlink control channel transmission to the first UE within the first TTI based at least in part on the CRS.

4. The method of claim 1, wherein configuring the CRS comprises:

configuring a CRS transmission power based at least in part on the channel quality of the first UE; and configuring a concurrent downlink control channel transmission power of the downlink control channel transmission based at least in part on the CRS transmission power.

5. The method of claim 1, further comprising:

identifying a set of UEs that are to receive a second downlink transmission during a second TTI;

identifying a second UE of the set of UEs having a poorer channel quality than other UEs of the set of UEs;

configuring a second CRS based at least in part on the channel quality of the second UE; and transmitting the second CRS to the set of UEs during the second TTI.

6. The method of claim 1, wherein the initial symbol of the first TTI comprises a set of resource elements (REs), and wherein the configuring the CRS comprises:

configuring the first subset of the set of REs for transmission of the CRS;

configuring the second subset of the set of REs for the downlink control channel transmission when the channel quality of the first UE exceeds the threshold value;

configuring a first power for the first subset of REs based at least in part on the channel quality of the first UE; and configuring a second power for the second subset of REs based at least in part on the first power.

7. The method of claim 6, wherein the downlink control channel transmission comprises a physical downlink control channel (PDCCH) transmission.

8. The method of claim 7, further comprising:

transmitting signaling to the first UE that indicates whether the PDCCH transmission starts in the initial symbol or in the second symbol.

9. The method of claim 6, wherein the first power for the first subset of the REs is configured with a higher power than the second power for the second subset of REs.

10. The method of claim 9, wherein the first power for the first subset of REs is configured with equivalent power as the second power for the second subset of REs.

11. The method of claim 1, wherein each of the initial symbol of the first TTI and the second symbol of the first TTI comprise a set of resource elements (REs), and wherein the configuring the CRS comprises:

configuring the first subset of REs to span across the initial symbol and second symbol for transmission of the CRS;

configuring the second subset of REs in each of the initial symbol and second symbol for transmission of the downlink control channel transmission.

12. The method of claim 11, further comprising:

transmitting signaling to the first UE, based at least in part on the channel quality of the first UE, that the first UE is to receive the CRS transmitted in the initial symbol or that the first UE is to combine CRS transmissions from the initial symbol and the second symbol.

13. The method of claim 1, further comprising: transmitting, based at least in part on the channel quality of the first UE, signaling to the first UE that indicates whether only the initial symbol of the first TTI or both the initial symbol and the second symbol of the first TTI include CRS and downlink control information, and, when both the initial symbol and the second symbol include CRS and downlink control information, whether the second symbol includes CRS transmissions.

14. The method of claim 1, wherein the configuring the CRS comprises: configuring a first CRS for transmission in the first subset of resource elements of the initial symbol of the first TTI based at least in part on the channel quality of the first UE.

15. The method of claim 14, wherein the configuring the CRS further comprises:

determining whether the channel quality of the first UE exceeds the threshold value;

configuring the downlink control channel transmission in the second subset of resource elements of the initial symbol when the channel quality of the first UE exceeds the threshold value; and configuring a second CRS for transmission in the second subset of resource elements of the initial symbol when the channel quality of the first UE does not exceed the threshold value.

16. A method for wireless communication, comprising:

receiving, at a user equipment (UE), a downlink transmission from a base station during a first transmission time interval (TTI);

determining a cell-specific reference signal (CRS) configuration of the downlink transmission, the CRS configuration indicating that a first subset of resource elements of an initial symbol within the first TTI include a CRS and whether a second subset of resource elements of the initial symbol include a downlink control channel transmission based at least in part on a channel quality of the UE during the first TTI, and wherein the downlink control channel transmission is deferred to a second symbol of the first TTI after the initial symbol when the downlink control channel transmission is absent from the second subset of resource elements as a result of the channel quality of the UE being at or below a threshold; and receiving the CRS and the downlink control channel transmission based at least in part on the CRS configuration.

17. The method of claim 16, further comprising: determining a starting point for the downlink control channel transmission within the first TTI based at least in part on the CRS configuration.

18. The method of claim 16, further comprising:

receiving signaling that indicates a starting point for a physical downlink control channel (PDCCH) transmission within the first TTI.

19. The method of claim 18, wherein the signaling comprises layer-one (L1) signaling transmitted in the initial symbol of the first TTI or a search space restriction for the first UE.

20. The method of claim 18, wherein each of the initial symbol of the first TTI and the second symbol of the first TTI comprise a portion of the CRS, and wherein the receiving the CRS comprises: combining the portions of the CRS received in the initial symbol and second symbol.

21. The method of claim 20, further comprising:
receiving signaling that the portions of the CRS from the initial symbol and the second symbol are to be combined.

22. The method of claim 16, further comprising:
receiving signaling from the base station that indicates whether only the initial symbol of the first TTI or both the initial symbol and the second symbol of the first TTI include CRS and the downlink control channel transmission, and, when both the initial symbol and the second symbol include CRS and the downlink control channel transmission, whether the second symbol includes a portion of the CRS.

23. The method of claim 16, wherein the determining the CRS configuration comprises:
determining that a first CRS is configured for transmission in the first subset of resource elements of the initial symbol of the first TTI; and
determining whether the downlink control channel transmission is configured in the second subset of resource elements of the initial symbol or a second CRS is configured for transmission in the second subset of resource elements of the initial symbol.

24. The method of claim 23, wherein determining the CRS configuration comprises blindly detecting a presence of the second CRS.

25. An apparatus for wireless communication, comprising:
a processor;
memory in electronic communication with the processor; and
the processor and memory configured to:
identify at least a first user equipment (UE) that is to receive a downlink transmission during a first transmission time interval (TTI);
identify a channel quality of the first UE;
configure a cell-specific reference signal (CRS) to occupy at least a first subset of resource elements of an initial symbol within the first TTI based at least in part on the channel quality of the first UE;
determine whether a downlink control channel transmission is to be transmitted in a second subset of resource elements of the initial symbol based at least in part on whether the channel quality of the first UE exceeds a threshold value, and wherein the downlink control channel transmission is deferred to a second symbol of the first TTI after the initial symbol when the channel quality of the first UE is at or below the threshold value; and
transmit the CRS and the downlink control channel transmission to the first UE during the first TTI.

26. The apparatus of claim 25, wherein the processor and memory are further configured to:
identify a set of UEs that are to receive a second downlink transmission during a second TTI;
identify a second UE of the set of UEs having a poorer channel quality than other UEs of the set of UEs;
configure a second CRS based at least in part on the channel quality of the second UE; and
transmit the second CRS to the second set of UEs during the second TTI.

27. The apparatus of claim 25, wherein the initial symbol of the TTI comprises a set of resource elements (REs), and wherein the processor and memory are further configured to:
configure the first subset of REs for transmission of the CRS;
configure the second subset of REs for the downlink control channel transmission;
configure a first power for the first subset of REs based at least in part on the channel quality of the first UE; and
configure a second power for the second subset of REs based at least in part on the first power.

28. A user equipment (UE) apparatus for wireless communication, comprising:
a processor;
memory in electronic communication with the processor; and
the processor and memory configured to:
receive a downlink transmission from a base station during a first transmission time interval (TTI);
determine a cell-specific reference signal (CRS) configuration of the downlink transmission, the CRS configuration indicating that a first subset of resource elements of an initial symbol within the first TTI include a CRS and whether a second subset of resource elements of the initial symbol include a downlink control channel transmission based at least in part on a channel quality of the UE during the first TTI, and wherein the downlink control channel transmission is deferred to a second symbol of the first TTI after the initial symbol when the downlink control channel transmission is absent from the second subset of resource elements as a result of the channel quality of the UE being at or below a threshold; and
receive the CRS and the downlink control channel transmission based at least in part on the CRS configuration.

29. The apparatus of claim 28, wherein the processor and memory are further configured to: determine a starting point for the downlink control channel transmission within the first TTI based at least in part on the CRS configuration.

* * * * *